United States Patent
Yamazaki et al.

(10) Patent No.: US 9,316,857 B2
(45) Date of Patent: Apr. 19, 2016

(54) DISPLAY DEVICE

(71) Applicant: Semiconductor Energy Laboratory Co., Ltd., Atsugi-shi, Kanagawa-ken (JP)

(72) Inventors: Shunpei Yamazaki, Tokyo (JP); Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 195 days.

(21) Appl. No.: 13/958,007

(22) Filed: Aug. 2, 2013

(65) Prior Publication Data

US 2014/0043546 A1      Feb. 13, 2014

(30) Foreign Application Priority Data

Aug. 10, 2012  (JP) ................. 2012-177915

(51) Int. Cl.
  *G02F 1/1335*  (2006.01)
  *G06F 3/041*   (2006.01)
  *G06F 3/045*   (2006.01)
  *G06F 3/033*   (2013.01)
  *G02F 1/1333*  (2006.01)
  *G02F 1/1362*  (2006.01)

(52) U.S. Cl.
  CPC ...... *G02F 1/13338* (2013.01); *G02F 1/133512* (2013.01); *G02F 1/136209* (2013.01); *G02F 2201/07* (2013.01)

(58) Field of Classification Search
  CPC ... G02F 1/13338; H01L 27/322; H01L 51/52; G06F 3/0412
  USPC ............ 349/12; 345/104, 156, 173, 175, 177
  See application file for complete search history.

(56) References Cited

U.S. PATENT DOCUMENTS

| | | | |
|---|---|---|---|
| 7,341,924 B2* | 3/2008 | Takayama et al. | 438/455 |
| 7,378,157 B2* | 5/2008 | Sakakura et al. | 428/451 |
| 8,854,328 B2* | 10/2014 | Kurashima | 345/173 |
| 2003/0034497 A1* | 2/2003 | Yamazaki et al. | 257/86 |
| 2006/0146033 A1 | 7/2006 | Chen et al. | |
| 2011/0149185 A1 | 6/2011 | Yamazaki | |
| 2012/0104938 A1 | 5/2012 | Chu et al. | |
| 2013/0021289 A1* | 1/2013 | Chen et al. | 345/174 |
| 2013/0257798 A1 | 10/2013 | Tamura et al. | |
| 2013/0321333 A1 | 12/2013 | Tamura | |
| 2014/0014960 A1 | 1/2014 | Yamazaki et al. | |

FOREIGN PATENT DOCUMENTS

| | | |
|---|---|---|
| JP | 2006-189859 A | 7/2006 |
| JP | 2012-099450 A | 5/2012 |

OTHER PUBLICATIONS

Engineering Tool box.*

* cited by examiner

*Primary Examiner* — Hoan C Nguyen
(74) *Attorney, Agent, or Firm* — Fish & Richardson P.C.

(57) ABSTRACT

A reduction in the weight of a display device with a touch sensor is achieved while a decrease in the sensitivity thereof is suppressed. The display device includes, between a pair of substrates, a touch sensor, a color filter, and a display portion provided with a display element. A stress relief layer whose product of the dielectric constant and specific gravity is smaller than that of the substrate provided with the touch sensor is provided, whereby parasitic capacitance between an electrode and a wiring included in the touch sensor and an electrode and a wiring included in the display portion can be reduced.

20 Claims, 11 Drawing Sheets

DISPLAY DEVICE

BACKGROUND OF THE INVENTION

1. Field of the Invention

The present invention relates to a display device with a touch sensor.

2. Description of the Related Art

A variety of electronic devices provided with display devices, such as a cell phone, a smartphone, a personal computer, a tablet terminal, a portable game machine, and a portable music player, have recently come into widespread use. More intuitively operable electronic devices can be each obtained by providing a touch sensor so as to overlap with a display portion for image display as an interface of such a portable electronic device.

In the display portion, a liquid crystal display device, a display device including an organic electroluminescence (EL) element, an electronic paper performing display by an electrophoretic method, or the like is used.

Typical touch sensors are of resistive type and of capacitive type; besides, a variety of types such as a surface acoustic wave type and an infrared type are known.

As a method for providing a touch sensor so as to overlap with a display portion of a display device, the following method is often employed. A display panel including the display portion for image display and a touch panel including the touch sensor are separately formed and then they are overlapped with each other. In recent years, a reduction in the total weight and a reduction in the manufacturing cost by incorporating a touch panel into a display panel have been considered. For example, Patent Document 1 discloses a structure of a liquid crystal display device in which a touch sensor (referred to as a digitizer sensor board or the like) is provided between a color filter and a substrate over which the color filter is formed.

REFERENCE

Patent Document

[Patent Document 1] Japanese Published Patent Application No. 2006-189859

SUMMARY OF THE INVENTION

In the case where a display device has a structure in which an electrode of a touch sensor is provided between a pair of substrates included in a display panel, there is a problem in that parasitic capacitance between the electrode of the touch sensor and a wiring and an electrode of the display panel is increased and detection sensitivity of the touch sensor cannot be sufficiently obtained.

For example, in the structure illustrated in FIG. 3A of Patent Document 1, a touch sensor (referred to as a digitizer sensor film) and a color filter layer are stacked over a glass substrate and extremely large parasitic capacitance is generated between electrodes of the touch sensor and a liquid crystal element with the color filter layer and a liquid crystal layer interposed therebetween. Thus, in such a structure, the detection sensitivity of the touch sensor is significantly impaired. Similarly, in the structure illustrated in FIG. 3B of Patent Document 1, the detection sensitivity is significantly impaired by large parasitic capacitance generated between the touch sensor and a TFT array.

In addition, in the structure described in Patent Document 1, an outermost glass cover, a polarizing plate, a glass substrate, and the like exist between a surface touched with a finger or the like (referred to as a touch surface) and the touch sensor, and a relatively long distance therebetween leads to a reduction in the detection sensitivity. Further, in such a structure, a reduction in the total weight is difficult.

Thus, it is an object of one embodiment of the present invention to reduce the weight of a display device with a touch sensor while a reduction in the detection sensitivity thereof is prevented.

In order to achieve the above object, the present inventors have focused on a structure in which a capacitive touch sensor, a color filter, and a display portion including a display element are provided between a pair of substrates, and have thought of the idea of reducing parasitic capacitance between an electrode and a wiring included in the touch sensor and an electrode and a wiring included in the display portion by provision of a layer formed of a low-dielectric constant material between the touch sensor and the display portion.

That is, a display device of one embodiment of the present invention includes a first substrate and a second substrate which face each other; a sensor layer and a color filter layer which are stacked in this order between the second substrate and the first substrate from a second substrate side; a display element including a pair of electrodes between the first substrate and the color filter layer; and a stress relief layer between the sensor layer and the color filter layer. The sensor layer includes a light-transmitting electrode. The product of the specific gravity and dielectric constant of the stress relief layer is smaller than that of the second substrate.

With such a structure, both of the display element and the touch sensor can be provided between the pair of substrates, so that a reduction in the weight of the display device can be achieved. Further, by the stress relief layer whose product of the specific gravity and dielectric constant is smaller than that of the second substrate, parasitic capacitance between the electrode included in the sensor layer and the electrode included in the display element can be effectively reduced while an increase in the weight of the display device is suppressed.

Further, the display device preferably has the following structure. The sensor layer includes a first electrode to a third electrode over the same surface, an insulating layer, and a wiring; the wiring is electrically connected to the first electrode and the third electrode through an opening provided in the insulating layer, and is provided so as to overlap with the second electrode with the insulating layer interposed therebetween; and a product of the specific gravity and dielectric constant of the insulating layer is smaller than that of the second substrate.

The distance between the electrode for detection and the touch surface is decreased by provision of the electrode for detection on the side closer to the second substrate in this manner, so that a capacitive touch sensor with extremely high detection sensitivity can be obtained. Further, provision of the wiring for electrically connecting the electrode for detection on the side closer to the display element with the insulating layer provided therebetween enables the distance between the electrode for detection and the display element to be increased. Thus, parasitic capacitance between the electrode for detection and the display element can be reduced while the increase in the weight of the display element is prevented.

In any one of the above-described display devices, the stress relief layer preferably includes a layer containing a polarizer.

With such a structure, the stress relief layer can function as a polarizing layer that polarizes transmitted light. For example, in a conventional liquid crystal display device, it is necessary to position a polarizing plate outside a substrate on the touch surface side of the display device and to provide a substrate for protecting the polarizing plate, such as tempered glass, on the outermost surface to be a touch surface. However, with the above-described structure, the polarizing plate and the substrate provided on the outermost surface are not required, so that the display device can be effectively reduced in weight. Further, in a display device in which an organic EL element is used, the stress relief layer can function as an antireflection film, so that contrast of display can be improved.

In any one of the above-described display devices, the display element preferably includes a liquid crystal in an electric field formed by the pair of electrodes.

In any one of the above-described display devices, the display element is provided with a layer containing a light-emitting organic compound interposed between the pair of electrodes.

Note that in this specification and the like, dielectric constant of an object is the ratio of the permittivity of the object to the permittivity of vacuum, and the dielectric constant is dimensionless quantity. Further, dielectric constant of an object in this specification and the like is a value in the case where frequency of an external electric field is small enough not to generate dielectric dispersion (e.g., 100 kHz or less).

Note that in this specification, and the like, the specific gravity of an object is an average density of the object relative to the density of water under atmospheric pressure at 4° C., and the specific gravity is dimensionless quantity. Further, the specific gravity of an object in this specification and the like, is a value under atmospheric pressure at 25° C. unless otherwise specified.

In this specification, the display device includes any of the following modules in its category: a module in which a connector such as a flexible printed circuit (FPC) or a tape carrier package (TCP) is attached to a display device; a module having a TCP provided with a printed wiring board at the end thereof; and a module having an integrated circuit (IC) directly mounted over a substrate over which a light-emitting element is formed by a chip on glass (COG) method.

According to the present invention, in a display device provided with a touch sensor, a reduction in the weight of the display device is achieved while a reduction in the detection sensitivity is prevented.

DETAILED DESCRIPTION OF THE INVENTION

Figure 1:
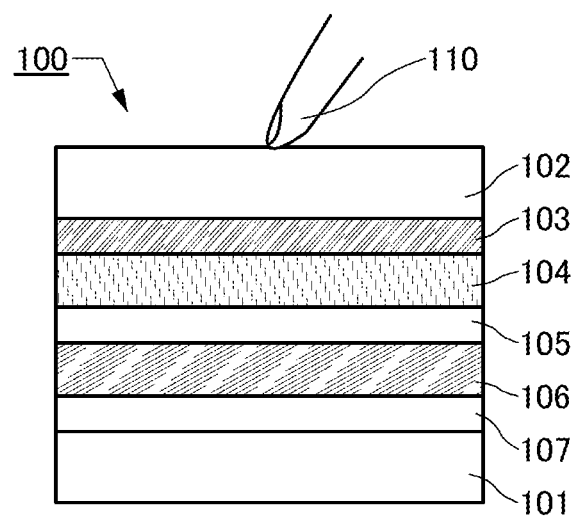
FIG. 1 illustrates a display device according to one embodiment of the present invention.

Embodiments will be described in detail with reference to the drawings. Note that the invention is not limited to the following description, and it will be easily understood by those skilled in the art that various changes and modifications can be made without departing from the spirit and scope of the invention. Therefore, the invention should not be construed as being limited to the description in the following embodiments. Note that in the structures of the invention described below, the same portions or portions having similar functions are denoted by the same reference numerals in different drawings, and description of such portions is not repeated.

Note that in each drawing described in this specification, the size, the layer thickness, or the region of each component is exaggerated for clarity in some cases. Therefore, embodiments of the present invention are not limited to such scales.

Embodiment 1

In this embodiment, a structural example of a display device according to one embodiment of the present invention is described with reference to drawings.

FIG. 1 is a schematic view of a display device 100 exemplified in this embodiment. The display device 100 includes a first substrate 101 and a second substrate 102. Between the first substrate 101 and the second substrate 102, a TFT layer 107, a display element layer 106, a color filter layer 105, a stress relief layer 104, and a sensor layer 103 are stacked in this order from the first substrate 101 side.

The TFT layer 107 includes a transistor, a wiring, and the like for driving the display element layer 106. Note that in the case of a passive matrix display device, a transistor is not necessary, and only a wiring and an electrode are provided.

The display element layer 106 includes a plurality of display elements. Each of the display elements includes at least a pair of electrodes. As the display element, typically, a liquid crystal element, an organic EL element, or the like can be used. In addition, a display element in which an electrophoresis element or the like is interposed between the pair of electrodes may be used.

The color filter layer 105 includes color filters overlapping with the display elements in the display element layer 106. For example, when the color filter layer 105 is provided with three color filters of red (R), green (G), and blue (B), a display device capable of full-color display can be obtained. The color filter layer 105 may include a black matrix or the like in addition to the color filters.

The sensor layer 103 functions as a touch sensor which senses proximity or touch of a conductive object to be sensed such as a finger 110 to the second substrate 102 from the outside. As the touch sensor provided for the sensor layer 103, a capacitive touch sensor is preferable. Examples of the capacitive touch sensor are of a surface capacitive type, of a projected capacitive type, and the like. Further, examples of the projected capacitive type are of a self capacitive type, a mutual capacitive type, and the like mainly in accordance with the difference in the driving method. The use of a mutual capacitive type is preferable because multiple points can be sensed simultaneously.

Figure 2A:
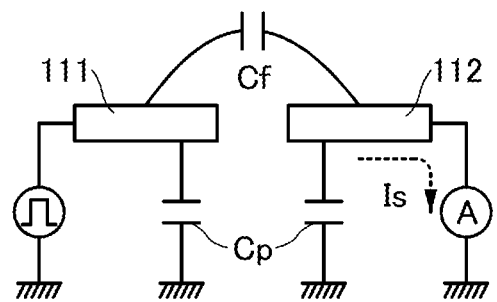
FIGS. 2A to 2C each illustrate a touch sensor according to one embodiment of the present invention.

Here, the operation of a capacitive touch sensor and the influence of parasitic capacitance on detection sensitivity are described. FIG. 2A is a schematic view of a mutual capacitive touch sensor. For simplicity, an example of one sensor element is described here.

The sensor element includes a pair of electrodes (an electrode 111 and an electrode 112). Mutual capacitance Cf is formed between the electrode 111 and the electrode 112. Further, each of the electrode 111 and the electrode 112 is connected to a parasitic capacitance Cp.

AC voltage (or pulse voltage) is input to the electrode 111. Further, a sensor unit which senses current is electrically connected to the electrode 112. Thus, in accordance with a change in voltage input to the electrode 111, current Is flowing through the electrode 112 coupled to the electrode 111 by the mutual capacitance Cf can be sensed by the sensor unit. Here, the value of current Is is proportional to the value of the mutual capacitance Cf.

Figure 2B:
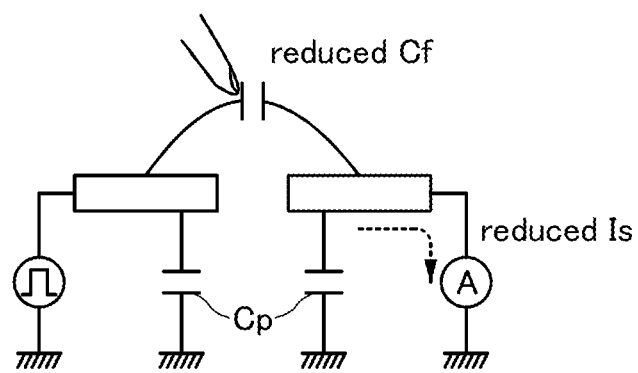

Here, as illustrated in FIG. 2B, when a conductive object to be sensed such as a finger or the like comes close to the pair of electrodes of the sensor element, the value of the mutual capacitance Cf is reduced. Thus, in accordance with the change in the mutual capacitance Cf, the value of current Is flowing through the electrode 112 is reduced. By detecting the difference in the current Is, touch operation can be detected.

However, when the value of parasitic capacitance Cp connected to the electrode 111 and the electrode 112 is large, the value of current flowing through the electrode 112 is reduced by capacitive coupling. As a result, detection sensitivity of the touch operation is reduced.

Figure 2C:
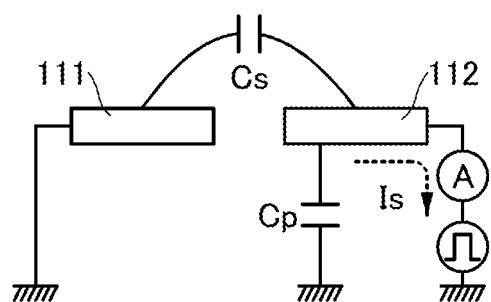

As another example, FIG. 2C is a schematic view of a self capacitive touch sensor. In the self capacitive touch sensor, constant potential is applied to the electrode 111, and current Is at the time when AC voltage is applied to the electrode 112 that is capacitively coupled to the electrode 111 by self-capacitance Cs is sensed. The self-capacitance Cs is changed by the presence or absence of an object to be sensed. By detecting the change in the current Is owing to the change in the self-capacitance Cs, touch operation can be detected. However, similarly to the above, the larger the parasitic capacitance Cp connected to the electrode 112 is, the smaller the change in the current Is is; thus, detection sensitivity is decreased.

Note that such a problem of a decrease in the detection sensitivity due to the parasitic capacitance Cp occurs in a general capacitive touch sensor which performs detection using capacitive coupling, such as a surface capacitive touch sensor.

Thus, in order to obtain favorable detection sensitivity of a capacitive touch sensor which performs detection using capacitive coupling, it is desirable to achieve at least one of the following: making the parasitic capacitance Cp as small as possible; and making the amount of change in the capacitance for detection as large as possible.

The above is the description of the touch sensor.

The display device 100 illustrated in FIG. 1 includes the stress relief layer 104 between the sensor layer 103 and the color filter layer 105. The product of the specific gravity and dielectric constant of the stress relief layer 104 is smaller than that of the second substrate 102.

In the display device 100, the second substrate 102 is positioned closest to the touch surface. Thus, a material and a thickness of the second substrate 102 are preferably determined so that the change in the capacitance (e.g., the above-described mutual capacitance Cf) for detection is made as large as possible. Further, it is preferable that the strength of the second substrate 102 be secured so that damage to the display device 100 due to touch operation is prevented.

The change in the capacitance for detection is increased by thinning the second substrate 102; however, the strength of the second substrate 102 is decreased. Thus, as a material for the second substrate 102, a material having a high dielectric constant is preferably used for securing the strength. The use of an insulating material with a large specific gravity is preferable because the strength and the dielectric constant can be increased.

The stress relief layer 104 is formed using a material whose product of the specific gravity and dielectric constant is smaller than that of the second substrate 102, whereby parasitic capacitance generated between the electrode of the sensor layer 103 and the electrode of the display element layer 106 can be effectively reduced while the increase in the weight due to the provision of the stress relief layer 104 is suppressed. Further, the second substrate 102 is formed using a material whose product of the specific gravity and dielectric constant is larger than that of the stress relief layer 104, so that the change in the capacitance for detection can be increased without damaging the strength. Thus, the decrease in the parasitic capacitance and the increase in the capacitance for detection enable the detection sensitivity of the touch sensor to be extremely high.

APPLICATION EXAMPLE

An example where a liquid crystal element is applied to the display element included in the display element layer 106 and an example where a light-emitting element is applied to the display element included in the display element layer 106 are described below.

Figure 3A:
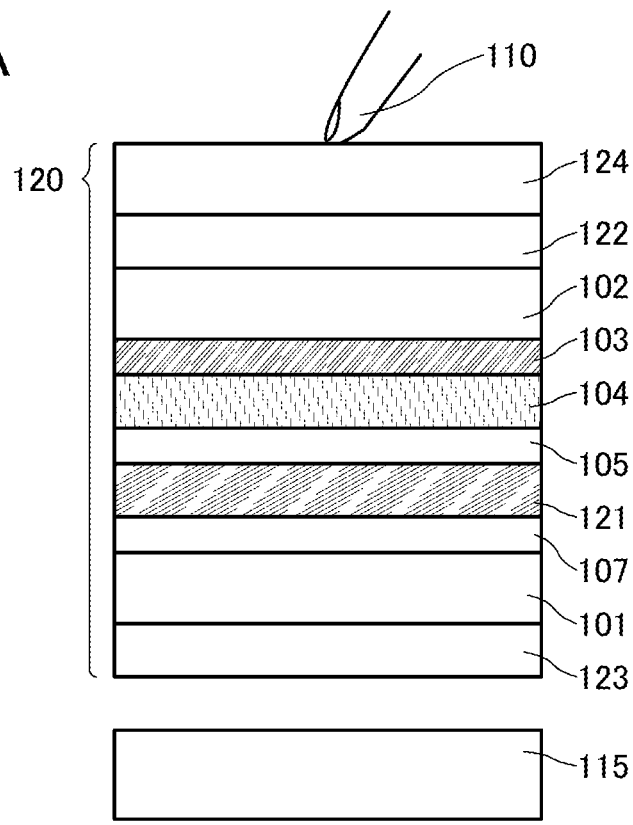
FIGS. 3A and 3B each illustrate a display device according to one embodiment of the present invention.

A display device 120 illustrated in FIG. 3A is different from the display device 100 illustrated in FIG. 1 in that a liquid crystal element layer 121 is used instead of the display element layer 106 and a polarizing plate 122, a polarizing plate 123, and a protective substrate 124 are used.

The liquid crystal element layer 121 includes a liquid crystal element provided with a pair of electrodes and a liquid crystal. As the liquid crystal, a thermotropic liquid crystal, a low molecular liquid crystal, a high molecular liquid crystal, a ferroelectric liquid crystal, an anti-ferroelectric liquid crystal, or the like can be used. Moreover, a liquid crystal exhibiting a blue phase is preferably used because an alignment film is not necessary and the viewing angle is wide.

As a structure of the liquid crystal element, any of the following can be used: an in-plane-switching (IPS) mode, a twisted nematic (TN) mode, a vertical alignment (VA) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

Here, the liquid crystal element preferably has an IPS mode or an FFS mode. A liquid crystal element having such a mode does not require an electrode to be provided on the second substrate 102 side. Thus, it is possible to reduce the influence of parasitic capacitance generated between an electrode of the touch sensor provided on the second substrate 102 side and the electrode of the liquid crystal element, thereby improving the sensitivity of the touch sensor.

The polarizing plate 122 is provided over a surface of the second substrate 102 which is opposite to the surface facing the sensor layer 103. The polarizing plate 123 is provided on a surface of the first substrate 101 which is opposite to the surface facing the TFT layer 107.

In order to protect the surface of the polarizing plate 122, the protective substrate 124 is provided over a surface of the polarizing plate 122 which is opposite to the surface facing the second substrate 102. Here, mechanical strength of the protective substrate 124 is preferably high because one surface of the protective substrate 124 serves as a touch surface.

By controlling transmission of light from a backlight 115 provided on the first substrate 101 side of the display device 120, display of the display device 120 can be performed.

The display device 120 includes the stress relief layer 104 between the sensor layer 103 and the color filter layer 105 and thus is lightweight and has high sensitivity of the touch sensor.

Figure 3B:
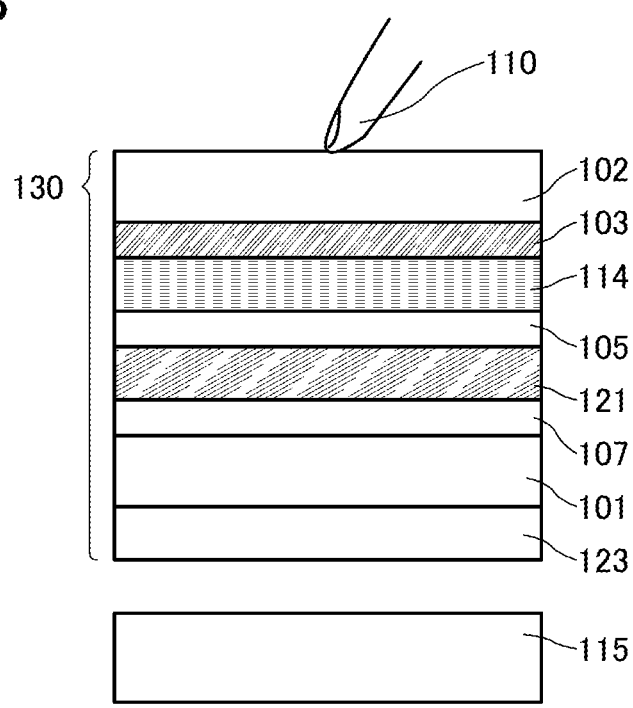

FIG. 3B illustrates a structural example of a display device 130 whose structure is partly different from that of the display device 120. The display device 130 is different from the display device 120 in that a stress relief layer 114 is provided instead of the stress relief layer 104 and that the polarizing plate 122 and the protective substrate 124 are not provided.

The stress relief layer 114 includes a polarizer and functions as a polarizing plate which polarizes light from the backlight 115 which has passed through the liquid crystal element in the liquid crystal layer 121.

The stress relief layer 114 having such a function is provided between the sensor layer 103 and the color filter layer 105, whereby it is not necessary to provide the polarizing plate 122 and the protective substrate 124 outside the second substrate 102. Thus, the weight of the display device 130 can be further reduced. Further, a surface of second substrate 102, which does not face the sensor layer 103, acts as a touch surface by omission of the polarizing plate 122 and the protective substrate 124. Therefore, the change in capacitance for detection between the touch surface and the sensor layer 103 can be increased and detection sensitivity can be extremely high.

Figure 4:
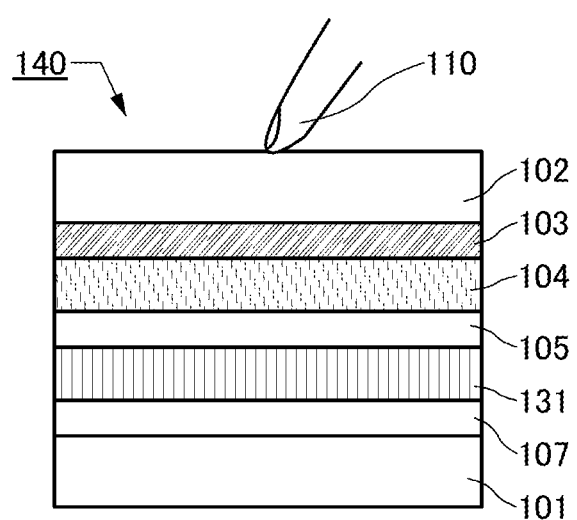
FIG. 4 illustrates a display device according to one embodiment of the present invention.

A display device 140 illustrated in FIG. 4 is different from the display device 100 illustrated in FIG. 1 in that a light-emitting element layer 131 is used instead of the display element layer 106.

The light-emitting element layer 131 includes a light-emitting element in which a layer containing a light-emitting organic compound is provided between a pair of electrodes. A specific structural example of the light-emitting element will be described in an embodiment below.

The display device 140 having such a structure needs neither a back light nor a polarizing plate and thus can be lighter than the display device in which a liquid crystal element is used.

The above is the description of the application examples.

In any of the display devices described in this embodiment, the sensor is provided between the first substrate and the second substrate and the stress relief layer is provided between the sensor layer and the color filter layer. Further, the product of the specific gravity and dielectric constant of the stress relief layer is smaller than that of the second substrate. Thus, a display device that is extremely lightweight and has high sensitivity of the touch sensor can be realized.

This embodiment can be implemented in an appropriate combination with any of the other embodiments described in this specification.

Embodiment 2

In this embodiment, as an example of a method for manufacturing a display device of one embodiment of the present invention, an example of a method for manufacturing a display device in which a liquid crystal element is used is described with reference to drawings.

Example of Manufacturing Method 1

Figure 5A:
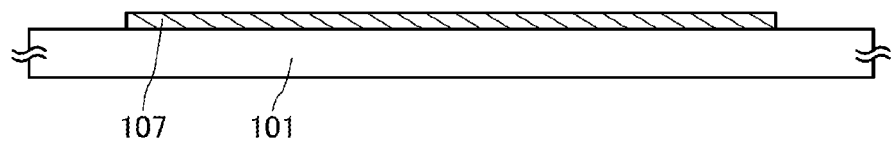
FIGS. 5A to 5E illustrate a method for manufacturing a display device according to one embodiment of the present invention.

First, a TFT layer 107 is formed over the first substrate 101 (see FIG. 5A).

The first substrate 101 is formed using a material having an insulating surface and having light-transmitting properties to visible light. A glass material, a resin material, or the like can be used for the material of the first substrate 101. Further, when the display device is used with being curved, a flexible resin material, a glass material that is thin enough to have flexibility, or a composite material or a laminated material of these materials is used for the first substrate 101.

The TFT layer 107 includes at least a transistor. The TFT layer 107 may include a capacitor in addition to the transistor. Further, the TFT layer 107 may include a driving circuit (a gate driving circuit, a source driving circuit), and the like. Furthermore, the TFT layer 107 may include a wiring and an electrode.

The TFT layer 107 can be manufactured by an appropriate manufacturing method. For example, in the case of an active matrix display device in which a liquid crystal element is used, a gate electrode (and a wiring), a gate insulating layer, a semiconductor layer, and a source electrode and a drain electrode (and wirings) which form a transistor are provided over the first substrate 101. Further, an electrode of the liquid crystal element is formed thereover so as to be electrically connected to the transistor. Note that the electrode becomes part of the liquid crystal element layer 121 to be formed later. Further, an alignment film for controlling alignment of a liquid crystal may be formed over the electrode.

Figure 5B:
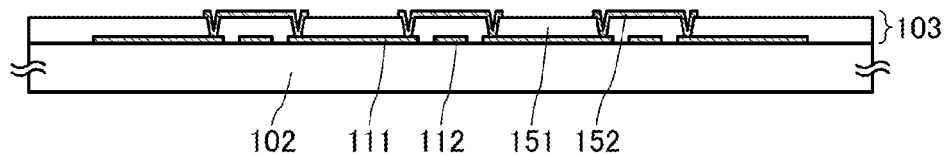

Subsequently, the sensor layer 103 is formed over the second substrate 102 (FIG. 5B). Here, the case of using a projected capacitive touch sensor for the sensor layer 103 is described.

First, the second substrate 102 is prepared. For the second substrate 102, a material similar to that used for the first substrate 101 can be used. Note that in the case where a surface of the second substrate 102 on which the sensor layer 103 is not formed is a touch surface, a glass substrate, specifically, a tempered glass substrate with increased strength is preferably used as the second substrate 102. Alternatively, a resin material whose surface is coated with a hard layer formed using an inorganic material may be used. Further, when the display device is used with being curved, a flexible resin material, a glass material that is thin enough to have flexibility, or a composite material or a laminated material of these materials is used for the second substrate 102.

For example, as an example of a glass material that can be used for the second substrate 102, a glass material whose dielectric constant is greater than or equal to 3.5 and less than or equal to 10.0, and specific gravity is greater than or equal to 2.0 and less than or equal to 4.5 can be given.

The thickness of the second substrate 102 is determined depending on the material. For example, in the case of using a glass material, the thickness is preferably set to greater than or equal to 10 µm and less than or equal to 2 mm, preferably greater than or equal to 50 µm and less than or equal to 1 mm. As the second substrate 102 is thinner, the detection sensitivity of the touch sensor can be improved.

Next, the electrode 111 and the electrode 112 which have light-transmitting properties are formed over the second substrate 102. The electrode 111 and the electrode 112 are formed in such a manner that after a conductive film is formed by a sputtering method or the like, an unnecessary portion of the conductive film is removed using a patterning technique such as a photolithography method.

Next, an insulating layer 151 having light-transmitting properties, which covers the electrode 111 and the electrode 112, is formed. The insulating layer 151 is preferably formed using a material whose product of the specific gravity and dielectric constant is smaller than that of the second substrate 102. As a material of the insulating layer 151, for example, a resin such as acrylic or epoxy, a resin having a siloxane bond, or an inorganic insulating material such as silicon oxide, silicon oxynitride, or an aluminum oxide an be used.

Next, after openings which reach the electrode 111 are formed in the insulating layer 151, a wiring 152 that is electrically connected to the electrode 111 is formed over the insulating layer 151. The wiring 152 is preferably formed using a material that has higher conductivity than each of the electrode 111 and the electrode 112.

The electrode 112 is provided in the form of stripes in one direction (a direction perpendicular to the paper). Further, the electrode 111 is provided such that the electrode 112 is sandwiched by a pair of electrodes 111, and the wiring 152 that electrically connects the pair of electrodes 111 is provided so as to intersect with the electrode 112. Here, one electrode 112 and a plurality of electrodes 111 electrically connected to each other by the wiring 152 do not necessarily intersect orthogonally and may form an angle of less than 90°.

Through the above steps, the sensor layer 103 can be formed over the second substrate 102.

Figure 5C:
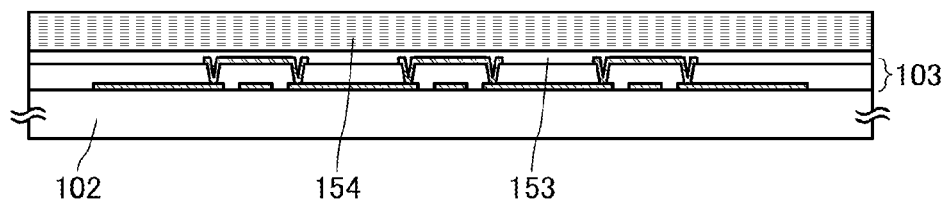

Subsequently, the stress relief layer 154 is formed over the sensor layer 103 (FIG. 5C).

The stress relief layer 154 can have the same structure as those of the stress relief layer 104 and the stress relief layer 114 that are described in Embodiment 1.

As the stress relief layer 154, for example, a resin such as acrylic, epoxy, polyimide, polyamide, polyamideimide, polyethylene terephthalate (PET), polyethylene naphthalate (PEN), polybutylene terephthalate (PBT), polyarylalte (PAR), polyether sulfone (PES), polycarbonate (PC), polyether etherketone (PEEK), polysulfone (PSF), polyetherimide (PEI), acrylonitrile-butadiene styrene, polyvinyl chloride, polypropylene, polyvinyl acetate, polyester, or a resin having a siloxane bond, or a glass such as barium borosilicate glass, or aluminoborosilicate glass, or the like can be used.

Further, a resin containing a polarizer is preferably used as the stress relief layer 154 so as to have a function as a polarizing plate. In that case, a material capable of producing linearly polarized light from natural light or circularly polarized light is used. For example, a material whose optical anisotropy is obtained by disposing dichroic substances in one direction can be used. For example, the stress relief layer 154 can be formed in such a manner that an iodine-based compound or the like is adsorbed to a film or the like such as a polyvinyl alcohol film and the film or the like is stretched in one direction. Note that as the dichroic substance, a dye-based compound or the like as well as an iodine-based compound can be used.

The stress relief layer 154 is formed using a material having a film shape, a sheet shape, or a plate shape.

The stress relief layer 154 having a film shape can be formed by spin coating, dip coating, spray coating, a droplet discharge method, a printing method such as a screen printing method, or a formation method using a tool such as a doctor knife, a roll coater, a curtain coater, or a knife coater.

In the case of using the material having a film shape, a sheet shape or a plate shape, the material is attached to the sensor layer 103 with the a bonding layer 153 provided therebetween. The bonding layer 153 is acceptable as long as it has light-transmitting properties and can bond the stress relief layer 154 and a surface to be bonded. The bonding layer 153 can be formed using a thermosetting resin or an ultraviolet curable resin. For example, an acrylic resin, a urethane resin, an epoxy resin, or a resin having a siloxane bond can be used.

For example, in the case of using an acrylic resin as the stress relief layer 154, acrylic whose dielectric constant is greater than or equal to 2.5 and less than or equal to 4.5 and specific gravity is greater than or equal to 1.0 and less than or equal to 1.3 is used. The use of a material containing a resin as the stress relief layer 154 is preferable because both dielectric constant and specific gravity can be reduced.

The thickness of the stress relief layer 154 can be set depending on the material. In the case of using an acrylic resin, the thickness thereof is set to greater than or equal to 5 μm and less than or equal to 3 mm, preferably greater than or equal to 10 μm and less than or equal to 2 mm.

In this embodiment, a material containing a polarizer and having a sheet shape is used for the stress relief layer 154, and the stress relief layer 154 is attached to the sensor layer 103 with the use of the bonding layer 153.

Subsequently, a planarization layer 155 is formed over the stress relief layer 154. The planarization layer 155 can be formed using a material similar to that used for the insulating layer 151. The planarization layer 155 is provided so as to planarize the surface of the stress relief layer 154 by covering the surface thereof. The provision of the planarization layer 155 makes it possible to suppress variation in the thickness of the color filters in the color filter layer 105 to be formed later and variation in luminance among pixels. Further, the provision of the planarization layer 155 makes it possible to protect the surface of the stress relief layer 154 in a later formation process of the color filter layer 105. Note that in the case where the top surface of the stress relief layer 154 is sufficiently planarized and is able to withstand the formation of the color filter layer 105, the planarization layer 155 is not necessarily provided.

Figure 5D:
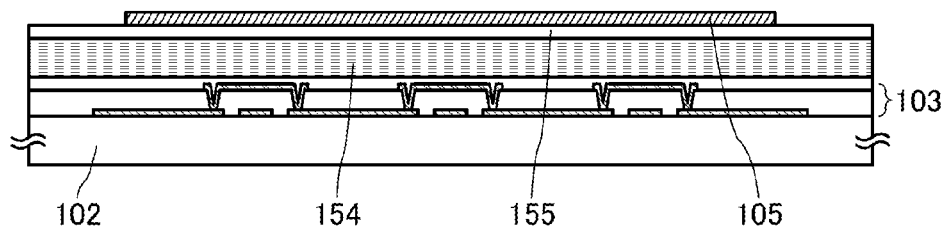

Next, the color filter layer 105 is formed over the planarization layer 155 (FIG. 5D). The color filter layer 105 can be formed using a photosensitive material including a pigment by a photolithography method. Further, as the color filter layer 105, a black matrix may be provided between color filters with different colors. Further, an overcoat is preferably provided so as to cover the color filters and the black matrix.

Note that one of electrodes of the liquid crystal element may be formed on the color filter layer 105 in accordance with the structure of the liquid crystal element. Note that the electrode becomes part of the liquid crystal element layer 121 to be formed later. Further, an alignment film may be formed over the electrode.

Through the above steps, the sensor layer 103, the stress relief layer 154, and the color filter layer 105 can be stacked over the second substrate 102.

Note that there is no limitation on the order of the step of forming the TFT layer 107 over the first substrate 101 and the step of forming the sensor layer 103, the stress relief layer 154, and the color filter layer 105 over the second substrate 102. Either of the steps may be conducted first, or the two steps may be concurrently conducted.

Figure 5E:
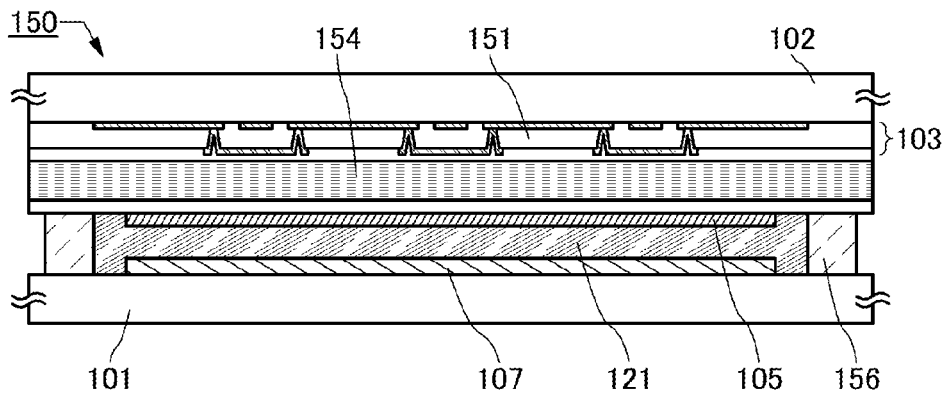

Next, a liquid crystal is sealed by a sealant 156 in a state of being interposed between the first substrate 101 and the second substrate 102, whereby the liquid crystal element layer 121 is formed (FIG. 5E).

The liquid crystal can be formed by a dispenser method (a dropping method), or an injecting method by which a liquid crystal is injected using a capillary phenomenon after the first substrate 101 is attached to the second substrate 102.

As the sealant 156, a material similar to that used for the bonding layer 153 can be used. Further, the sealant 156 may be formed using glass frit including low-melting glass.

Through the above steps, the display device 150 can be manufactured. In the display device 150, layers of the stress relief layer 154, the insulating layer 151, the bonding layer 153, the planarization layer 155, the color filter layer 105, and the like are provided between the electrode of the liquid crystal element layer 121 and the electrode (the electrode 111 or the electrode 112) of the sensor layer 103 for detection; thus, parasitic capacitance generated between the electrodes is extremely reduced. Further, the stress relief layer 154 contains a polarizer and functions as a polarizing plate; thus, one surface of the second substrate 102 can be used as a touch surface. With such a structure, a display device that is lightweight and whose touch sensor has high sensitivity can be realized.

The above is the description of Example of Manufacturing Method 1.

Example of Manufacturing Method 2

An example of a method for manufacturing a display device, which is partly different from the above-described Example of Manufacturing Method 1, is described with reference to drawings below. Note that description of the same portions as those in Example of Manufacturing Method 1 is skipped or simplified in some cases.

First, as in Example of Manufacturing Method 1, the TFT layer 107 is formed over the first substrate 101.

Similarly to the above description, the sensor layer 103 and the stress relief layer 154 are formed over the second substrate 102.

Here, a support substrate 161 is prepared. A substrate having a relatively planarized surface is used as the support substrate 161. As the support substrate 161, a non-light-transmitting substrate such as a metal substrate or a ceramic substrate can be used other than a substrate using a material similar to that used for the first substrate 101 or the second substrate 102.

Subsequently, a separation layer 162 and a layer to be separated 163 are stacked over the support substrate 161. Here, a combination of materials which can be separated at the interface of the separation layer 162 and the layer to be separated 163 is used for the separation layer 162 and the layer to be separated 163.

For example, a metal such as tungsten is used for the separation layer 162, and an oxide such as silicon oxide is used for the layer to be separated 163. At this time, a surface of the metal is oxidized by contact with the oxide, and an oxide of the metal (e.g., tungsten oxide) is formed. Here, the interface between the separation layer 162 and the layer to be separated 163 is physically separated by application of external force.

Alternatively, a metal and a resin may be used as the separation layer 162 and the layer to be separated 163, respectively; in such a case, separation can be performed by the control of adhesion between the separation layer 162 and the layer to be separated 163. Further alternatively, the separation layer 162 and the layer to be separated 163 each may have a surface with high planarity; in such a case, bonding can be performed by close contact between the two surfaces with high planarity.

Note that a surface of the support layer 161 may be used as the separation layer 162 and the layer to be separated 163 may be formed on and in contact with the support substrate 161. For example, a metal substrate and a resin can be used as the support substrate 161 and the layer to be separated 163, respectively. Alternatively, for example, a relatively thick glass substrate and a relatively thin glass substrate can be used as the support substrate 161 and the layer to be separated 163, respectively; in such a case, bonding can be performed by close contact between the two surfaces with high planarity.

Figure 6A:
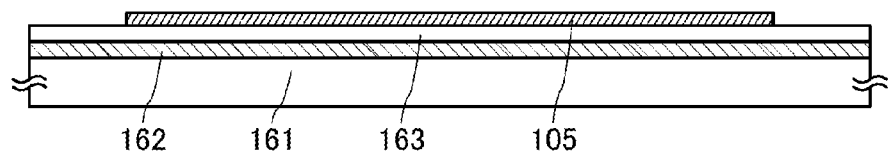
FIGS. 6A to 6C illustrate a method for manufacturing a display device according to one embodiment of the present invention.

Next, the color filter layer 105 is formed on the layer to be separated 163 (FIG. 6A). The color filter layer 105 can be formed by a method similar to the method described in Example of Manufacturing Method 1.

Next, the second substrate 102 and the support substrate 161 are attached to each other with a bonding layer 164 so that the sensor layer 103 and the color filter layer 105 face each other. Here, for the bonding layer 164, a material similar to that used for the bonding layer 153 can be used.

Figure 6B:
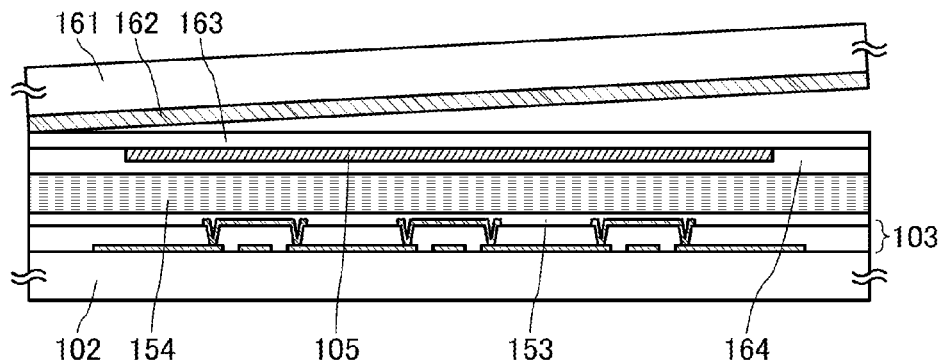

After the second substrate 102 and the support substrate 161 are attached to each other, separation is caused at the interface between the separation layer 162 and the layer to be separated 163, so that the support substrate 161 is separated (FIG. 6B).

As the method for separation, for example, the second substrate 102 is fixed by a suction stage or the like and a starting point of separation is formed between the separation layer 162 and the layer to be separated 163. For example, the starting point of separation may be formed by inserting a sharp instrument such as a knife into the boundary. Alternatively, the starting point of separation may be formed by dripping a liquid that has low surface tension (such as alcohol or water) onto end portions of the two substrates so that the liquid penetrates into the boundary between the two substrates.

Then, by applying physical force gradually from the starting point of separation in a direction substantially perpendicular to the attachment surfaces, separation can be easily caused without damage to the support substrate 161. At this time, for example, separation may be caused by attaching tape or the like to the support substrate 161 and pulling the tape in the aforementioned direction, or separation may be caused by pulling an end portion of the support substrate 161 with a hook-like member. Alternatively, separation may be caused by attaching a member capable of vacuum suction to the back side of the support substrate 161.

At the time of separation, static electricity might be generated and the second substrate 102 might be charged therewith. When the second substrate 102 is charged, a circuit or an element in the sensor layer 103 might be damaged by electrostatic discharge (ESD). In order to suppress this, separation is preferably caused in a state where a conductive liquid (e.g., an ionic liquid, water including ions such as carbonated water, or the like) is dripped onto the starting point of separation and the liquid is constantly in contact with the separation interface. Alternatively, separation may be caused while the generation of ESD is being suppressed using an ionizer or the like.

Figure 6C:
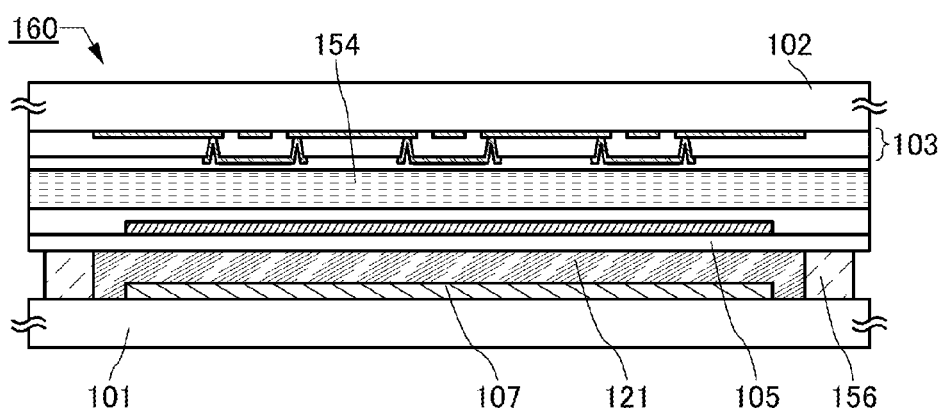

Next, a liquid crystal is provided between the first substrate 101 and the second substrate 102 and is sealed by the sealant 156, whereby the liquid crystal element layer 121 is formed (FIG. 6C). As a formation method and a sealing method of the liquid crystal, the same methods described in Example of Manufacturing Method 1 can be used.

Through the above steps, the display device 160 can be manufactured.

In Example of Manufacturing Method 2, the color filter layer 105 is formed over the support substrate 161 and then transferred to the stress relief layer 154, whereby the color filter layer 105 is formed over the stress relief layer 154. Thus, as compared with the case where the color filter layer 105 is directly formed over the stress relief layer 154, the color filter layer 105 can be formed over a highly planarized surface without being influenced by an uneven shape of the surface of the stress relief layer 154; therefore, the color filter layer 105 which has high definition and in which variation in transmissivity is reduced can be obtained. Further, the stress relief layer 154 is not influenced by the steps of forming the color filter layer 105, which is preferable because materials of the stress relief layer 154 can be selected more freely.

The above is the description of Example of Manufacturing Method 2.

This embodiment can be implemented in an appropriate combination with any of the other embodiments described in this specification.

Embodiment 3

In this embodiment, a more specific structural example of a display device of one embodiment of the present invention is described with reference to drawings. Hereinafter, description of the same portions as the above embodiments is omitted or is simplified in some cases.

Structural Example 1

Figure 7A:
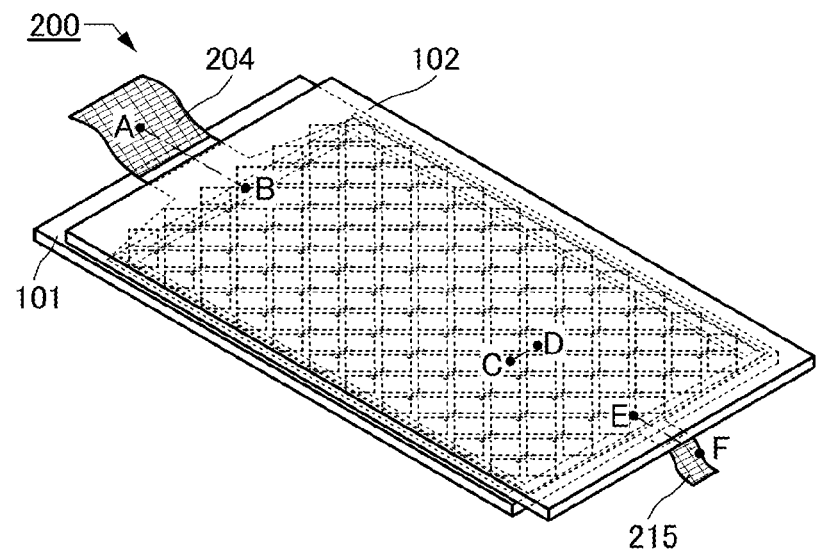
FIGS. 7A and 7B illustrate a display device according to one embodiment of the present invention.
Figure 7B:
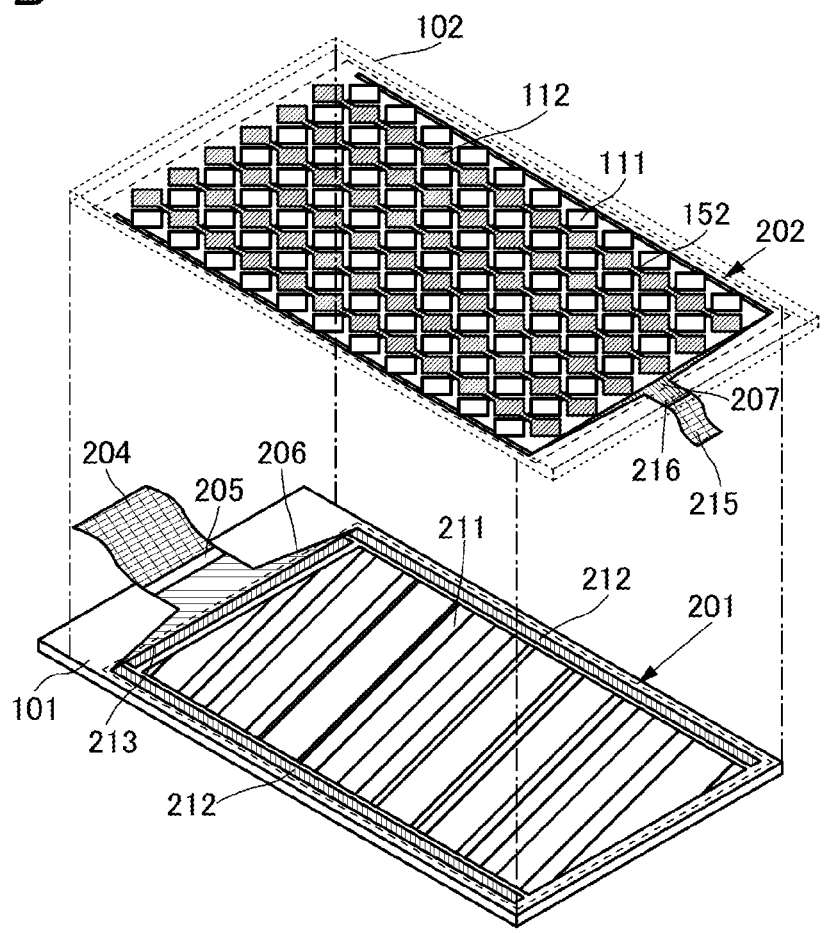

FIG. 7A is a perspective view schematically illustrating a display device 200 of this structural example. Note that FIGS. 7A and 7B illustrate only major components for simplicity. FIG. 7B is a developed perspective view schematically illustrating the display device 200.

The display device 200 includes a display portion 201 and a touch sensor 202 between the first substrate 101 and the second substrate 102.

The first substrate 101 is provided with the display portion 201 and a plurality of wirings 206 electrically connected to the display portion 201. The plurality of wirings 206 is led to the periphery of the first substrate 101, and some of the wirings form part of an external connection electrode 205 for electrical connection to an FPC 204.

The display portion 201 includes a pixel portion 211 including a plurality of pixels, a source driver circuit 212, and a gate driver circuit 213. Although FIG. 7B illustrates a structure in which two source driver circuits 212 are positioned on both sides of the pixel portion 211, one source driver circuit 212 may be positioned along one side of the pixel portion 211.

As a display element which can be used in the pixel portion 211 of the display portion 201, any of a variety of display elements such as an organic EL element, a liquid crystal element, and a display element performing display by an electrophoretic method or the like can be used.

The second substrate 102 is provided with the touch sensor 202 and a plurality of wirings 207 electrically connected to the touch sensor 202. The touch sensor 202 is provided over a surface of the second substrate 102 on a side facing the first substrate 101. The plurality of wirings 207 is led to the periphery of the second substrate 102, and some of the wirings form part of an external connection electrode 216 for electrical connection to an FPC 215. Note that in FIG. 7B, electrodes, wirings, and the like of the touch sensor 202 which are provided on the back side of the second substrate 102 (the back side of the diagram) are indicated by solid lines for clarity.

The touch sensor 202 illustrated in FIG. 7B is an example of a projected capacitive touch sensor. The touch sensor 202 includes the electrode 111 and the electrode 112. The electrode 111 and the electrode 112 are each electrically connected to any one of the plurality of wirings 207.

Here, the electrode 112 is in the form of a series of quadrangles arranged in one direction as illustrated in FIGS. 7A and 7B. The electrode 111 is also in the form of a quadrangle. A plurality of electrodes 111 arranged in a line in a direction intersecting the direction in which the electrode 112 extends is electrically connected to each other by the wiring 152. The electrode 112 and the wiring 152 are preferably arranged so that the area of the intersecting portion of the electrode 112 and the wiring 152 becomes as small as possible. Such a shape can reduce the area of a region where the electrodes are not provided and decrease luminance unevenness of light passing through the touch sensor 202 which may be caused by a difference in transmittance depending on whether the electrodes are provided or not.

Note that the shapes of the electrode 111 and the electrode 112 are not limited thereto and can be any of a variety of shapes. For example, the plurality of electrodes 111 may be arranged so as to have as small a gap as possible, and a plurality of electrodes 112 may be provided so as to be spaced apart and have regions not overlapping with the electrodes 111. In that case, between two adjacent electrodes 112, it is preferable to provide a dummy electrode which is electrically insulated from these electrodes, whereby the area of regions having different transmittances can be reduced.

Cross-Sectional Structural Example 1

A cross-sectional structural example of the display device 200 in which a liquid crystal element is included in the display portion 201 will be described below.

Figure 8:
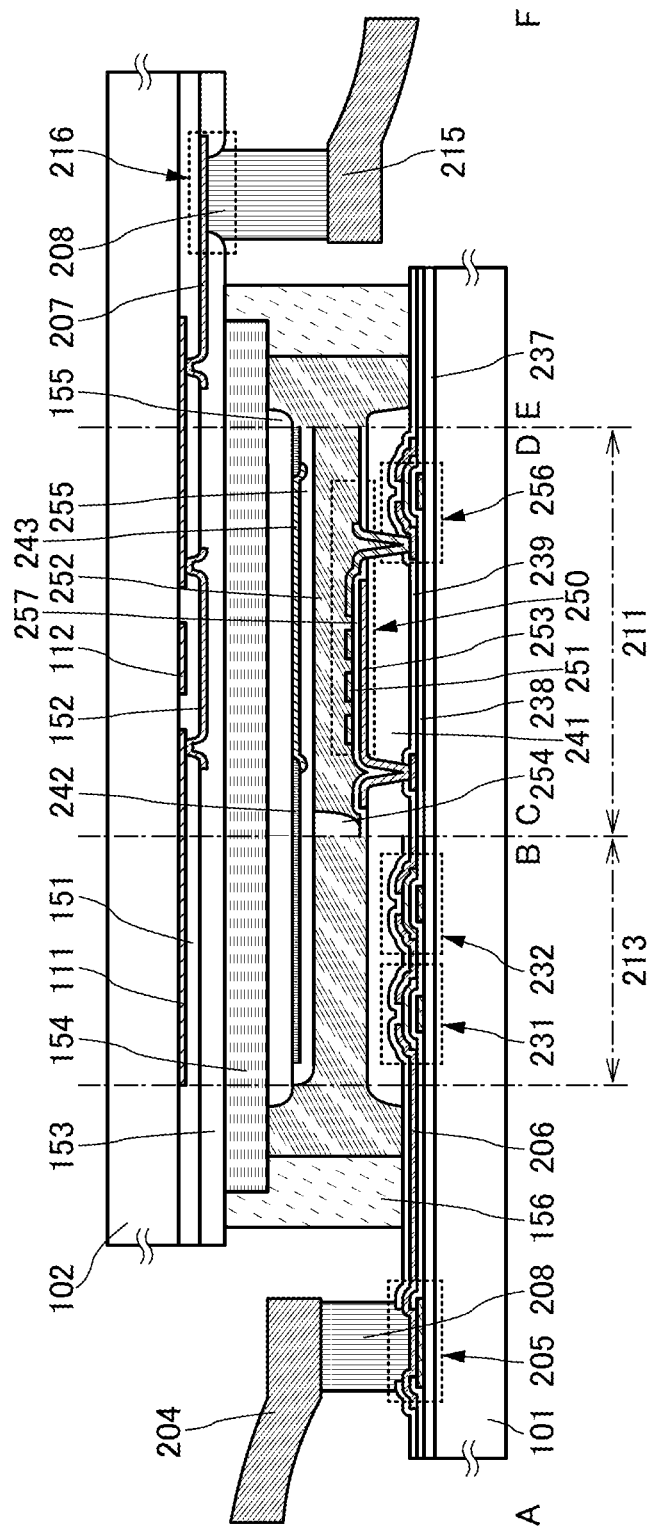
FIG. 8 illustrates a display device according to one embodiment of the present invention.

FIG. 8 is a schematic cross-sectional view of a region including the FPC 204 and the gate driver circuit 213 along the section line A-B, a region including the pixel portion 211 along the section line C-D, and a region including the FPC 215 along the section line E-F, in the display device 200 illustrated in FIG. 7A.

Peripheral portions of the first substrate 101 and the second substrate 102 are attached to each other with the sealant 156. In a region surrounded by the first substrate 101, the second substrate 102, and the sealant 156, at least the pixel portion 211 is provided In FIG. 8, the gate driver circuit 213 includes a circuit in which an n-channel transistor 231 and a transistor 232 are used in combination, as an example. Note that that the gate driver circuit 213 is not limited to this structure and may include various CMOS circuits in which an n-channel transistor and a p-channel transistor are used in combination or a circuit in which p-channel transistors are used in combination. Note that that the same applies to the source driver circuit 212. Although a driver-integrated structure in which the gate driver circuit 213 and the source driver circuit 212 are formed over an insulating surface provided with the display portion 201 is described in this structural example, the gate driver circuit 213 or the source driver circuit 212, or both may be formed over a surface different from the insulating surface provided with the display portion 201. For example, a driver circuit IC may be mounted by a COG method, or a flexible substrate (FPC) mounted with a driver circuit IC by a COF method may be mounted.

Note that there is no particular limitation on the structures of the transistors included in the pixel portion 211, the source driver circuit 212, and the gate driver circuit 213. For example, a forward staggered transistor or an inverted staggered transistor may be used. Further, a top-gate transistor or a bottom-gate transistor may be used. As a material of a semiconductor used for the transistors, for example, a semiconductor material such as silicon or germanium or an oxide semiconductor containing at least one of indium, gallium, and zinc may be used.

Further, there is no particular limitation on the crystallinity of a semiconductor used for the transistors, and an amorphous semiconductor or a semiconductor having crystallinity (a microcrystalline semiconductor, a polycrystalline semiconductor, or a semiconductor partly including crystal regions) may be used. A semiconductor having crystallinity is preferably used, in which case deterioration of transistor characteristics can be reduced.

Typical examples of the oxide semiconductor containing at least one of indium, gallium, and zinc include an In—Ga—Zn-based metal oxide, and the like. An oxide semiconductor having a wider band gap and a lower carrier density than silicon is preferably used because off-state leakage current can be reduced. Details of preferred oxide semiconductors will be described below in another embodiment.

FIG. 8 shows a cross-sectional structure of one pixel as an example of the pixel portion 211. The pixel portion 211 is provided with a liquid crystal element 250 having an FFS mode. In the liquid crystal element 250, the orientation of a liquid crystal is controlled by an electric field generated in an oblique direction to the substrate surface.

The one pixel includes at least one switching transistor 256 and a storage capacitor which is not illustrated. In addition, a first electrode 251 that is electrically connected to a source electrode or a drain electrode of the transistor 256 and has a comb shape is provided over the insulating layer 257. Furthermore, a second electrode 253 is provided over the insulating layer 241 with the insulating layer 257 provided therebetween so as to be insulated from the first electrode 251.

For the second electrode 253, or both of the first electrode 251 and the second electrode 253, a light-transmitting conductive material is used. It is preferable to use a light-transmitting conductive material for both of these electrodes because the aperture ratio of the pixel can be increased. As the light-transmitting material, a conductive oxide such as indium oxide, indium tin oxide, indium zinc oxide, zinc oxide, or zinc oxide to which gallium is added can be used.

Further, a color filter 243 and a black matrix 242 are provided over the second substrate 102 in at least a region overlapping with the pixel portion 211.

The color filter 243 is provided in order to adjust the color of light transmitted through a pixel to increase the color purity. For example, in a full-color display device using a white back light, a plurality of pixels provided with color filters of different colors are used. In that case, the color filters may be those of three colors of R (red), G (green), and B (blue) or four colors (yellow (Y) in addition to these three colors). Further, a white (W) pixel may be added to R, G, and B (and Y), i.e., color filters of four colors (or five colors) may be used.

A black matrix 242 is provided between the adjacent color filters 243. The black matrix 242 blocks light emitted from an adjacent pixel, thereby preventing color mixture between the adjacent pixels. In one configuration, the black matrix 242 may be provided only between adjacent pixels of different emission colors and not between pixels of the same emission color. Here, the color filter 243 is provided so that its end portions overlap with the black matrix 242, whereby light leakage can be reduced. The black matrix 242 can be formed using a material that blocks light transmitted through the pixel, for example, a metal material or a resin material including a pigment. Note that it is preferable to provide the black matrix 242 also in a region overlapping with the gate driver circuit 213 or the like besides the pixel portion 211 as illustrated in FIG. 8, in which case undesired leakage of guided light or the like can be prevented.

An overcoat 255 is provided so as to cover the color filter 243 and the black matrix 242. The overcoat 255 can suppress diffusion of impurities such as a pigment, which are included in the color filter 243 and the black matrix 242, into a liquid crystal 252. For the overcoat, a light-transmitting material is used, and an inorganic insulating material or an organic insulating material can be used.

In addition, a spacer 254 is provided in a region where the overcoat 255 overlaps with the black matrix 242. The spacer 254 is preferably formed using a resin material because it can be formed thick. For example, the spacer 254 can be formed using a positive or negative photosensitive resin. When a light-blocking material is used for the spacer 254, the spacer 254 blocks light emitted from an adjacent pixel, thereby preventing color mixture between the adjacent pixels. Although the spacer 254 is provided on the second substrate 102 side in this structural example, the spacer 254 may be provided on the first substrate 101 side. Further, a structure may be employed in which spherical silicon oxide particles are used as the spacer 254 and the particles are scattered in a region where the liquid crystal 252 is provided.

The liquid crystal 252 is sealed at least in a region where the first electrode 251 and the second electrode 253 are provided. Here, the first electrode layer 251, the second electrode layer 253, and the liquid crystal 252 form the liquid crystal element 250.

An image can be displayed in the following way: an electric field is generated in the oblique direction by application of voltage between the first electrode layer 251 and the second electrode layer 253, orientation of the liquid crystal 252 is controlled by the electric field, and polarization of light from a backlight provided outside the display device is controlled in each pixel.

An alignment film that controls alignment of the liquid crystal 252 may be provided on a surface in contact with the liquid crystal 252. A light-transmitting material is used for the alignment film. Although not illustrated here, a polarizing plate is provided outside the first substrate 101 with respect to the liquid crystal element 250. Moreover, a light guide plate may be used so that light from the backlight enters through a side surface of the display device.

In this structural example, a color filter is provided in a region overlapping with the liquid crystal element 250; thus, a full-color image can be displayed using a backlight that emits white light. With the use of a plurality of light-emitting diodes (LEDs) which emit light of different colors as a backlight, a time-division display method (a field-sequential driving method) can be employed. In the case of employing a time-division display method, the aperture ratio of each pixel or the number of pixels per unit area can be increased because neither color filters nor subpixels from which light of red (R), green (G), or blue (B), for example, is obtained are needed.

As the liquid crystal 252, a thermotropic liquid crystal, a low molecular liquid crystal, a high molecular liquid crystal, a ferroelectric liquid crystal, an anti-ferroelectric liquid crystal, or the like can be used. Moreover, a liquid crystal exhibiting a blue phase is preferably used because an alignment film is not necessary and the viewing angle is wide.

Although the liquid crystal element 250 having an FFS mode is described in this structural example, the structure of the liquid crystal element is not limited to this example, and the liquid crystal element 250 using any of the above-described modes can be used.

Here, the light-emitting element 250 preferably has an FFS mode or an IPS mode. A liquid crystal element having such a mode does not require an electrode to be provided on the second substrate 102 side. Thus, it is possible to reduce the parasitic capacitance between an electrode of the touch sensor provided on the second substrate 102 side and the electrode of the liquid crystal element, thereby improving the sensitivity of the touch sensor.

The first substrate 101 is provided with an insulating layer 237 in contact with an upper surface of the first substrate 101, an insulating layer 238 functioning as a gate insulating layer of transistors, and insulating layers 239 and 241 covering the transistors.

The insulating layer 237 is provided in order to prevent diffusion of impurities included in the first substrate 101. The insulating layers 238 and 239, which are in contact with semiconductor layers of the transistors, are preferably formed using a material which prevents diffusion of impurities that promote degradation of the transistors. For these insulating layers, for example, an oxide, a nitride, or an oxynitride of a semiconductor such as silicon or a metal such as aluminum can be used. Alternatively, a stack of such inorganic insulating materials or a stack of such an inorganic insulating material and an organic insulating material may be used. Note that the insulating layer 237 and the insulating layer 239 are not necessarily provided.

The insulating layer 241 functions as a planarization layer which covers steps due to the transistors, a wiring, or the like provided therebelow. For the insulating layer 241, it is preferable to use an organic resin material such as polyimide or acrylic. An inorganic insulating material may be used as long as high planarity can be obtained. Note that the insulating layer 241 is not necessarily provided.

Here, a structure excluding the first electrode 251 and the second electrode 253 from the stacked structure including the insulating layer 237 to the insulating layer 257 corresponds to the TFT layer 107. Further, a structure including the first electrode 251, the second electrode 253, and the liquid crystal 252 corresponds to the liquid crystal element layer 121.

The electrode 111, the electrode 112, the insulating layer 151, and the wiring 152 which form the touch sensor 202 are provided over a surface of the second substrate 102 on a side facing the liquid crystal element 250. Here, a structure including the electrode 111, the electrode 112, the insulating layer 151, and the wiring 152 corresponds to the sensor layer 103.

For the electrode 111 and the electrode 112, any of the above-described light-transmitting conductive materials can be used. For the wiring 152, other than a light-transmitting conductive material similar to that used for the above electrodes, a metal material such as aluminum, gold, platinum, silver, nickel, tungsten, chromium, molybdenum, iron, cobalt, copper, or palladium or an alloy material containing any of these metal materials can be used.

The stress relief layer 154 is formed over the insulating layer 151 and the wiring 152 with the bonding layer 153 provided therebetween when viewed from the second substrate 102. In this structural example, the stress relief layer 154 contains a polarizer and functions as a polarizing plate.

When viewed from the second substrate 102, the planarization layer 155 is provided over the stress relief layer 154, and the color filter 243, the black matrix 242, and the overcoat 255 are provided over the planarization layer 155.

In this structural example, a structure including the bonding layer 153, the stress relief layer 154, and the planarization layer 155 corresponds to the stress relief layer 104 in Embodiment 1. Further, a structure including the color filter 243, the black matrix 242, and the overcoat 255 corresponds to the color filter 105.

The wiring 206 over the first substrate 101 is provided so as to extend to the outside of the region sealed with the sealant 156 and is electrically connected to the gate driver circuit 213 (or the source driver circuit 212). Part of an end portion of the wiring 206 forms part of the external connection electrode 205. In this structural example, the external connection electrode 205 is formed by a stack of a conductive film used for the source electrode and the drain electrode of the transistor and a conductive film used for the gate electrode of the transistor. The external connection electrode 205 is preferably formed by a stack of a plurality of conductive films as described above because mechanical strength against a pressure bonding step performed on the FPC 204 or the like can be increased.

A connection layer 208 is provided in contact with the external connection electrode 205. The FPC 204 is electrically connected to the external connection electrode 205 through the connection layer 208. For the connection layer 208, an anisotropic conductive film (ACF), anisotropic conductive paste (ACP), or the like can be used.

The wiring 207 provided for the second substrate 102 is provided so as to extend to the outside of the region sealed with the sealant 156 and is electrically connected to the electrode 111 (or the electrode 112) of the touch sensor 202. Part of an end portion of the wiring 207 forms part of the external connection electrode 216, which is electrically connected to the FPC 215 through the connection layer 208, similarly to the wiring 206.

The end portions of the wiring 206, the wiring 207, the external connection electrode 205, and the external connection electrode 216 are preferably covered with an insulating layer so that surfaces thereof are not exposed because oxidation of the surfaces and defects such as undesired short circuits can be suppressed.

Note that in this structural example, the external connection electrode 216 for electrically connecting the touch sensor 202 and the FPC 215 is connected on the second substrate 102 side; however, the external connection electrode 216 may be provided on the first substrate 101 side. In that case, for example, a plurality of wirings which are electrically connected to the external connection electrode provided on the first substrate 101 side may be electrically connected to the electrode 111 or the electrode 112 of the touch sensor 202 on the second substrate 102 side using conductive particles which are dispersed in the liquid crystal 252. As the conductive particles, particles of a resin, silica, or the like coated with a metal material are used. It is preferable to use nickel or gold as the metal material because contact resistance can be decreased. It is also preferable to use particles each coated with layers of two or more kinds of metal materials, such as particles coated with nickel and further with gold. The provision of a plurality of FPCs 215 provided for a display device on one substrate side in such a manner is preferable because high layout flexibility can be provided when the display device is incorporated into a housing or the like of an electronic device.

The above is the description of this structure example. With such a structure, a display device that is lightweight and whose touch sensor has high sensitivity can be realized.

MODIFICATION EXAMPLE

An example of using a liquid crystal element having a VA mode in the above-described cross-sectional structural example 1 will be described below.

Figure 9:
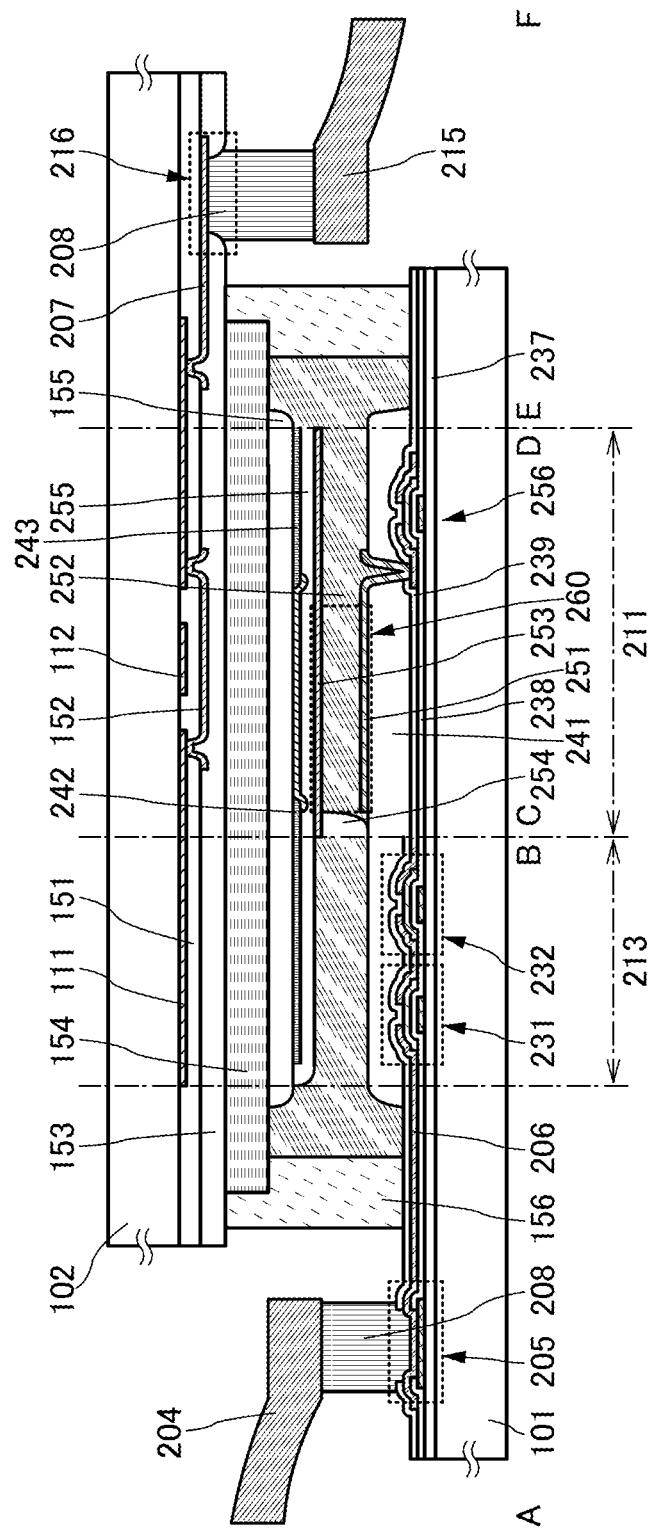
FIG. 9 illustrates a display device according to one embodiment of the present invention.

FIG. 9 is a schematic cross-sectional view of a display device described in this modification example. The display device shown in FIG. 9 is different from the cross-sectional structural example 1 in that a structure of a liquid crystal element of the display device is different.

A liquid crystal element 260 provided for a pixel includes the first electrode 251 provided over the insulating layer 241 on the first substrate 101 side, the second electrode 253 provided over the overcoat 255 on the second substrate 102 side, and the liquid crystal 252 sandwiched between the first electrode 251 and the second electrode 253.

With such a structure, the second electrode 253 is arranged on a side closer to the touch sensor 202 than the liquid crystal 252; thus, parasitic capacitance between the second electrode 253 and the electrode (the electrode 111 or the electrode 112) included in the touch sensor 202 may be increased. However, the provision of the stress relief layer 154 between the liquid crystal element 260 and the touch sensor 202 enables the parasitic capacitance to be reduced, and high sensitivity of the touch sensor 202 can be achieved even in the case of the display device using a liquid crystal element having a VA mode.

The above is the description of this modification example.

Cross-Sectional Structural Example 2

A cross-sectional structural example of a display device in which an organic EL element is used in the display portion 201 will be described below. Note that description of the same portions as those in the cross-sectional structural example 1 is skipped or simplified in some cases.

Figure 10:
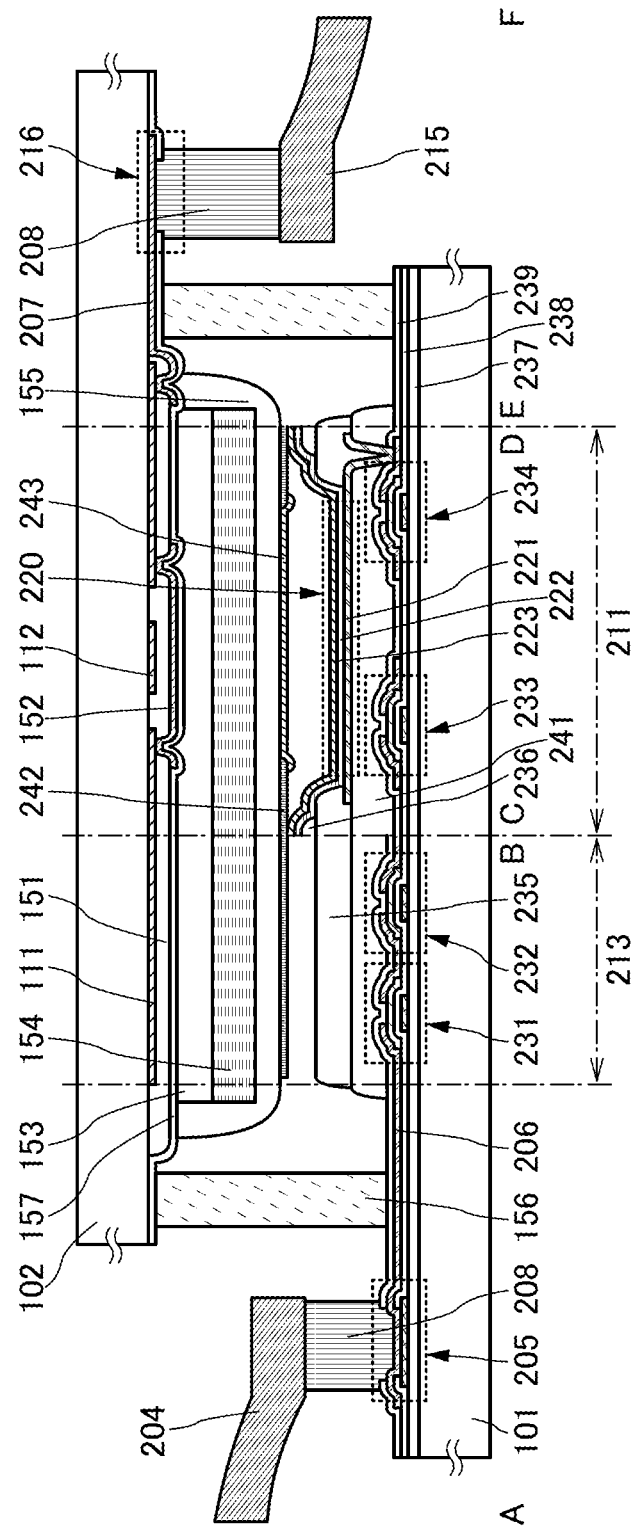
FIG. 10 illustrates a display device according to one embodiment of the present invention.

FIG. 10 is a schematic cross-sectional view of a display device described in this structural example. The display device shown in FIG. 10 is different from the above-described structural example 1 mainly in the structure of the pixel portion 211.

One pixel in the pixel portion 211 includes a switching transistor 233, a current control transistor 234, and a first electrode layer 221 that is electrically connected to an electrode (a source electrode or a drain electrode) of the transistor 234. An insulating layer 235 is provided so as to cover an end portion of the first electrode layer 221, and a spacer 236 is provided over the insulating layer 235 in a region overlapping with the black matrix 242. When a plurality of spacers 236 is provided in the pixel portion 211, the first substrate 101 and the second substrate 102 can be prevented from getting unnecessarily close to each other, and the display device can have high reliability.

A light-emitting element 220 includes a first electrode 221, a second electrode 223, and an EL layer 222 sandwiched between the first electrode 221 and the second electrode 223. The light-emitting element 220 is described below.

In the light-emitting element 220, a light-transmitting material that transmits light emitted from the EL layer 222 is used for an electrode provided on the light exit side.

As the light-transmitting material, other than the above-described conductive oxide, graphene, a metal material such as gold, silver, platinum, magnesium, nickel, tungsten, chromium, molybdenum, iron, cobalt, copper, palladium, or titanium or an alloy material containing any of these metal materials can be used. Further, a nitride of these metal materials (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

The electrode provided on the light exit side is formed by a vacuum evaporation method, a sputtering method, or the like. A discharging method such as an ink-jet method, a printing method such as a screen printing method, or a plating method may be used.

Note that when the above conductive oxide film having a light-transmitting property is formed by a sputtering method, the use of a deposition atmosphere containing argon and oxygen allows the light-transmitting property to be increased.

Further, in the case where the conductive oxide film is formed over the EL layer 222, it is preferable to stack a first conductive oxide film formed under an atmosphere containing argon with a reduced oxygen concentration and a second conductive oxide film formed under an atmosphere containing argon and oxygen because film formation damage to the EL layer 222 can be reduced. Here, the purity of an argon gas used for formation of the first conductive oxide film is preferably high, and for example, it is preferable to use the argon gas whose dew point is lower than or equal to −70° C., more preferably lower than or equal to −100° C.

For an electrode provided on a side opposite to the light exit side, a reflective material which reflects the light emission is used.

As a light reflective material, a metal material such as aluminum, gold, platinum, silver, nickel, tungsten, chromium, molybdenum, iron, cobalt, copper, or palladium or an alloy material containing any of these metal materials can be used. Alternatively, lanthanum, neodymium, germanium, or the like may be added to any of the above the metal materials or the alloy materials. Examples of alloy materials include alloys containing aluminum (aluminum alloys) such as an alloy of aluminum and titanium, an alloy of aluminum and nickel, and an alloy of aluminum and neodymium, alloys containing silver such as an alloy of silver and copper, an alloy of silver, palladium, and copper, and an alloy of silver and magnesium, and the like. An alloy of silver and copper is preferable because of its high heat resistance. Further alternatively, by stacking a metal film or a metal oxide film in contact with a film containing aluminum, oxidation of the film containing aluminum can be suppressed. Examples of the metal material or the metal oxide material in contact with the film containing aluminum include titanium, titanium oxide, and the like. Further alternatively, a stack of a film containing any of the above light-transmitting materials and a film containing any of the above metal materials may be used. For example, a stack of silver and indium tin oxide, a stack of an alloy of silver and magnesium and indium tin oxide, or the like can be used.

Such an electrode is formed by an evaporation method, a sputtering method, or the like. Alternatively, a discharging method such as an ink-jet method, a printing method such as a screen printing method, or a plating method may be used.

The EL layer 222 includes at least a layer containing a light-emitting organic compound (hereinafter also referred to as a light-emitting layer), and may be either a single layer or a stack of plural layers. One example of the structure in which a plurality of layers is stacked is a structure in which a hole-injection layer, a hole-transport layer, a light-emitting layer, an electron-transport layer, and an electron-injection layer are stacked in this order from an anode side. Note that not all of these layers except the light-emitting layer are necessarily provided in the EL layer 222. Further, each of these layers may be provided in duplicate or more. Specifically, in the EL layer 222, a plurality of light-emitting layers may be stacked. Furthermore, another component such as a charge-generation region may be added as appropriate. Alternatively, a plurality of light-emitting layers exhibiting different colors may be stacked. For example, a white emission can be obtained by stacking two or more light-emitting layers of complementary colors.

The EL layer 222 can be formed by a vacuum evaporation method, a discharging method such as an ink-jet method or a dispensing method, a coating method such as a spin-coating method, a printing method, or the like.

In this embodiment, a reflective material is used for the first electrode 221, and a light-transmitting material is used for the second electrode 223. Thus, the light-emitting element 220 is a top-emission light-emitting element, and emits light to the second substrate 102 side.

The above is the description of the light-emitting element 220.

Here, a structure excluding the first electrode 221 from the stacked structure including the insulating layer 238 to the spacer 236 corresponds to the TFT layer 107. Further, the stacked-structure including the first electrode 221, the EL layer 222, and the second electrode 223 corresponds to the display element layer 106.

In FIG. 10, the insulating layer 151 provided on the second substrate 102 is processed into an island shape so as not to overlap with the sealant 156, and an insulating layer 157 formed of an inorganic insulating material is formed on the top surfaces of the insulating layer 151 and the wiring 152. Further, the stress relief layer 154 and the bonding layer 153 are covered with the planarization layer 155, and the planarization layer 155 is not in contact with the sealant 156. Furthermore, each of the insulating layer 235 and the insulating layer 241 is formed in an island shape more on the inside than the sealant 156 so as not to be in contact with the sealant 156. In this manner, the layers formed using an organic material is provided so as not to be in contact with the sealant 156 or so as not to extend outside the sealant 156, so that impurities such as moisture is prevented from diffusing into the light-emitting element 220 or the transistor through the layer formed using an organic material. In the case of using an oxide semiconductor for a transistor, mixture of moisture can be effectively blocked.

With a structure in which the layer formed using an organic material is not used in a region overlapping with the sealant 156 as shown in FIG. 10, a glass material formed using a glass frit can be used for the sealant 156, and diffusion of impurities such as water into the light-emitting element 220 or a transistor can be effectively suppressed.

The above is the description of this structural example. With such a structure, a display device that is lightweight and whose touch sensor has high sensitivity can be realized.

This embodiment can be implemented in an appropriate combination with any of the other embodiments described in this specification.

Embodiment 4

An example of a semiconductor which is preferably used for the region in the transistor where a channel is formed which is exemplified in the above embodiment is described below.

An oxide semiconductor has a wide energy gap of 3.0 eV or more. A transistor including an oxide semiconductor film obtained by processing of the oxide semiconductor in an appropriate condition and a sufficient reduction in carrier density of the oxide semiconductor can have much lower leakage current between a source and a drain in an off state (off-state current) than a conventional transistor including silicon.

An applicable oxide semiconductor preferably contains at least indium (In) or zinc (Zn). In particular, In and Zn are preferably contained. In addition, as a stabilizer for reducing variation in electrical characteristics of a transistor using the oxide semiconductor, one or more elements selected from gallium (Ga), tin (Sn), hafnium (Hf), zirconium (Zr), titanium (Ti), scandium (Sc), yttrium (Y), and a lanthanoid (such as cerium (Ce), neodymium (Nd), or gadolinium (Gd)) is preferably contained.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components and there is no particular limitation on the ratio of In:Ga:Zn. The In—Ga—Zn-based oxide may contain a metal element other than the In, Ga, and Zn.

Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co, or the above-described element as a stabilizer. Alternatively, as the oxide semiconductor, a material expressed by a chemical formula, $In_2SnO_5(ZnO)_n$ (n>0, n is a natural number) may be used.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

A structure of an oxide semiconductor film is described below.

An oxide semiconductor film is classified roughly into a single-crystal oxide semiconductor film and a non-single-crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like.

First, a CAAC-OS film will be described.

The CAAC-OS film is one of oxide semiconductor films including a plurality of crystal parts, and most of each crystal part fits inside a cube whose one side is less than 100 nm. Thus, there is a case where a crystal part included in the CAAC-OS film fits a cube whose one side is less than 10 nm, less than 5 nm, or less than 3 nm.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when $2\theta$ is around 56°. This peak is derived from the (110) plane of the $InGaZnO_4$ crystal. Here, analysis ($\phi$ scan) is performed under conditions where the sample is rotated around a normal vector of a sample surface as an axis ($\phi$ axis) with $2\theta$ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\phi$ scan is performed with $2\theta$ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned with a direction parallel to a normal vector of a formation surface or a normal vector of a top surface of the CAAC-OS film. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of $2\theta$ may also be observed at around 36°, in addition to the peak of $2\theta$ at around 31°. The peak of $2\theta$ at around 36° indicates that a crystal having no c-axis alignment is included in part of the CAAC-OS film. It is preferable that in the CAAC-OS film, a peak of $2\theta$ appear at around 31° and a peak of $2\theta$ do not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has a low density of defect states, and thus has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Next, a microcrystalline oxide semiconductor film will be described.

In an image obtained with the TEM, crystal parts cannot be found clearly in the microcrystalline oxide semiconductor in some cases. In most cases, a crystal part in the microcrystalline oxide semiconductor is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as an nc-OS (nanocrystalline oxide semiconductor) film. In an image obtained with TEM, a crystal grain cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. However, there is no regularity of crystal orientation between different crystal parts in the nc-OS film; thus, the orientation of the whole film is not observed. Accordingly, in some cases, the nc-OS film cannot be distinguished from an amorphous oxide semiconductor depending on an analysis method. For example, when the nc-OS film is subjected to structural analysis by an out-of-plane method with an XRD apparatus using an X-ray having a beam diameter larger than that of a crystal part, a peak which shows a crystal plane does not appear. Further, a halo pattern is shown in a selected-area electron diffraction image of the nc-OS film obtained by using an electron beam having a probe diameter (e.g., larger than or equal to 50 nm) larger than that of a crystal part. Meanwhile, spots are shown in a nanobeam electron diffraction image of the nc-OS film obtained by using an electron beam having a probe diameter (e.g., larger than or equal to 1 nm and smaller than or equal to 30 nm) close to, or smaller than or equal to that of a crystal part. Further, in a nanobeam electron diffraction image of the nc-OS film, regions with high luminance in a circular (ring) pattern are shown in some cases. Also in a nanobeam electron diffraction image of the nc-OS film, a plurality of spots are shown in a ring-like region in some cases.

Since the nc-OS film is an oxide semiconductor film having more regularity than the amorphous oxide semiconductor film, the nc-OS film has a lower density of defect states than the amorphous oxide semiconductor film. However, there is no regularity of crystal orientation between different crystal parts in the nc-OS film; hence, the nc-OS film has a higher density of defect states than the CAAC-OS film.

Note that an oxide semiconductor film may be a stacked film including two or more films of an amorphous oxide semiconductor film, a microcrystalline oxide semiconductor film, and a CAAC-OS film, for example.

There are three methods for forming a CAAC-OS film when the CAAC-OS film is used as the oxide semiconductor film.

The first method is to form an oxide semiconductor film at a temperature higher than or equal to 100° C. and lower than or equal to 450° C. to form, in the oxide semiconductor film, crystal parts in which the c-axes are aligned in the direction parallel to a normal vector of a surface where the oxide semiconductor film is formed or a normal vector of a surface of the oxide semiconductor film.

The second method is to form an oxide semiconductor film with a small thickness and then heat it at a temperature higher than or equal to 200° C. and lower than or equal to 700° C., to form, in the oxide semiconductor film, crystal parts in which the c-axes are aligned in the direction parallel to a normal vector of a surface where the oxide semiconductor film is formed or a normal vector of a surface of the oxide semiconductor film.

The third method is to form a first oxide semiconductor film with a small thickness, then heat it at a temperature higher than or equal to 200° C. and lower than or equal to 700° C., and form a second oxide semiconductor film, to form, in the oxide semiconductor film, crystal parts in which the c-axes are aligned in the direction parallel to a normal vector of a surface where the oxide semiconductor film is formed or a normal vector of a surface of the oxide semiconductor film.

Further, it is preferable that the CAAC-OS film be deposited by a sputtering method with a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In this case, the flat-plate-like sputtered particle or the pellet-like sputtered particle reaches a surface where the CAAC-OS film is to be deposited while maintaining its crystal state, whereby the CAAC-OS film can be deposited.

For the deposition of the CAAC-OS film, the following conditions are preferably used.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in the deposition chamber may be reduced. Furthermore, the concentration of impurities in a deposition gas may be reduced. Specifically, a deposition gas whose dew point is −80° C. or lower, preferably −100° C. or lower is used.

By increasing the heating temperature of the surface where the CAAC-OS film is formed (for example, the substrate heating temperature) during the deposition, migration of a sputtered particle is likely to occur after the sputtered particle reaches the surface where the CAAC-OS film is formed. Specifically, the temperature of the surface where the CAAC-OS film is formed is higher than or equal to 100° C. and lower than or equal to 740° C., preferably higher than or equal to 200° C. and lower than or equal to 500° C. By increasing the temperature of the surface where the CAAC-OS film is formed during the deposition, when the flat-plate-like or pellet-like sputtered particle reaches the surface where the CAAC-OS film is formed, migration occurs on the surface where the CAAC-OS film is formed, so that a flat plane of the sputtered particle is attached to the surface where the CAAC-OS film is formed.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the sputtering target, an In—Ga—Zn—O compound target is described below.

The In—Ga—Zn—O compound target, which is polycrystalline, is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y and Z are given positive numbers. Here, the predetermined molar ratio of $InO_X$ powder to $GaO_Y$ powder and $ZnO_Z$ powder is, for example, 1:1:1, 1:1:2, 1:3:2, 2:1:3, 2:2:1, 3:1:1, 3:1:2, 3:1:4, 4:2:3, 8:4:3, or a ratio close to these ratios. The kinds of powder and the molar ratio for mixing powder may be determined as appropriate depending on the desired sputtering target.

The above is the description of the CAAC-OS film.

Further, when the oxide semiconductor film contains a large amount of hydrogen, the hydrogen and an oxide semiconductor are bonded to each other, so that part of the hydrogen serves as a donor and causes generation of an electron which is a carrier. As a result, the threshold voltage of the transistor shifts in the negative direction. Accordingly, the concentration of hydrogen in the oxide semiconductor film is preferably lower than $5 \times 10^{18}$ atoms/cm$^3$, more preferably lower than or equal to $1 \times 10^{18}$ atoms/cm$^3$, still more preferably lower than or equal to $5 \times 10^{17}$ atoms/cm$^3$, further more preferably lower than or equal to $1 \times 10^{16}$ atoms/cm$^3$. Note that the concentration of hydrogen in the oxide semiconductor film is measured by secondary ion mass spectrometry (SIMS).

After formation of the oxide semiconductor film, it is preferable that dehydration treatment (dehydrogenation treatment) be performed to remove hydrogen or moisture from the oxide semiconductor film so that the oxide semiconductor film is highly purified to contain impurities as little as possible, and that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) or substantially i-type oxide semiconductor film. The oxide semiconductor film formed in such a manner includes extremely few (close to zero) carriers derived from a donor, and the carrier concentration thereof is lower than $1 \times 10^{14}$/cm$^3$, preferably lower than $1 \times 10^{12}$/cm$^3$, further preferably lower than $1 \times 10^{11}$/cm$^3$, still further preferably lower than $1.45 \times 10^{10}$/cm$^3$.

The transistor including the oxide semiconductor film which is highly purified by sufficiently reducing the hydrogen concentration, and in which defect levels in the energy gap due to oxygen vacancies are reduced by sufficiently supplying oxygen can achieve excellent off-state current characteristics. For example, the off-state current per micrometer in the channel width with a channel length of 1 μm at room temperature (25° C.) is less than or equal to 100 yA (1 yA (yoctoampere) is $1 \times 10^{-24}$ A), desirably less than or equal to 10 yA. In addition, the off-state current per micrometer in the channel width at 85° C. is less than or equal to 100 zA (1 zA (zeptoampere) is $1 \times 10^{-21}$ A), desirably less than or equal to 10 zA. In this manner, the transistor which has extremely favorable off-state current characteristics can be obtained with the use of an i-type (intrinsic) or substantially i-type oxide semiconductor film.

Further, the oxide semiconductor film may have a structure in which a plurality of oxide semiconductor films is stacked.

For example, the oxide semiconductor film may be a stack of a first oxide semiconductor film, a second oxide semiconductor film, and a third oxide semiconductor film which have different compositions. For example, the following structure can be employed: the first oxide semiconductor film and the third oxide semiconductor film are formed using a three-component metal oxide and the second oxide semiconductor film is formed using a two-component metal oxide; or the first oxide semiconductor film and the third oxide semiconductor film are formed using a two-component metal oxide and the second oxide semiconductor film is formed using a three-component metal oxide.

Further, the constituent elements of the first oxide semiconductor film, the second oxide semiconductor film, and the third oxide semiconductor film may be the same and the proportions of the constituent elements of the first oxide semiconductor film, the second oxide semiconductor film, and the third oxide semiconductor film may be different. For example, the first oxide semiconductor film and the third oxide semiconductor film may each have an atomic ratio of In:Ga:Zn=1:1:1, and the second oxide semiconductor film may have an atomic ratio of In:Ga:Zn=3:1:2. Alternatively, the first oxide semiconductor film and the third oxide semiconductor film may each have an atomic ratio of In:Ga:Zn=1:3:2, and the second oxide semiconductor film may have an atomic ratio of In:Ga:Zn=3:1:2. Alternatively, the first oxide semiconductor film and the third oxide semiconductor film may each have an atomic ratio of In:Ga:Zn=1:3:2, and the second oxide semiconductor film may have an atomic ratio of In:Ga:Zn=1:1:1.

At this time, the first oxide semiconductor film and the third oxide semiconductor film preferably contain In and Ga at a proportion of In≤Ga.

In an oxide semiconductor, the s orbital of heavy metal mainly contributes to carrier conduction, and when the In content in the oxide semiconductor is increased, overlaps of the s orbitals are likely to be increased. Therefore, an oxide having a composition of In>Ga has higher mobility than an oxide having a composition of In≤Ga. Further, in Ga, the formation energy of an oxygen vacancy is larger and thus oxygen vacancies are less likely to be generated, than in In; therefore, the oxide having a composition of In≤Ga has more stable characteristics than the oxide having a composition of In>Ga.

Note that when the film (such as a gate insulating film) which is in contact with and is different from the oxide semiconductor film is formed, an impurity might be diffused into the oxide semiconductor film from the film formed to be in contact with the oxide semiconductor film. When silicon, carbon, or the like is diffused into the oxide semiconductor film, electrical characteristics of the transistor may be adversely affected.

This embodiment can be implemented in an appropriate combination with any of the other embodiments described in this specification.

Embodiment 5

In this embodiment, examples of electronic devices each including a display device with a touch sensor in one embodiment of the present invention will be described with reference to FIGS. 11A to 11D.

Figure 11A:
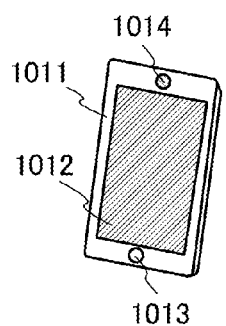
FIGS. 11A to 11D each illustrate an example of an electronic device including a display device according to one embodiment of the present invention.

An electronic device illustrated in FIG. 11A is an example of a portable information terminal.

The electronic device illustrated in FIG. 11A has a housing 1011 which is provided with a panel 1012, a button 1013, and a speaker 1014.

Note that the housing 1011 may be provided with a connection terminal for connecting the electronic device to an external device and a button for operating the electronic device.

The button 1013 is provided on the housing 1011. When the button 1013 is a power button, for example, the electronic device can be turned on or off by pressing the button 1013.

The speaker 1014 is provided on the housing 1011. The speaker 1014 outputs sound.

Note that the housing 1011 may be provided with a microphone, in which case the electronic device in FIG. 11A can function as a telephone, for example.

The electronic device illustrated in FIG. 11A functions as one or more of a telephone set, an e-book reader, a personal computer, and a game machine, for example.

In the panel 1012, the display device with a touch sensor in one embodiment of the present invention can be used.

Figure 11B:
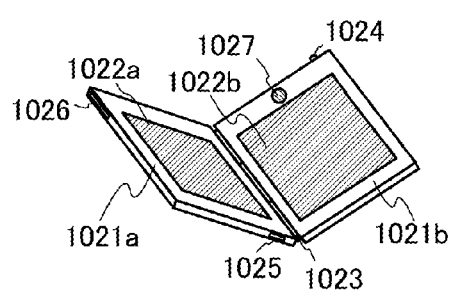

An electronic device illustrated in FIG. 11B is an example of a foldable information terminal.

The electronic device illustrated in FIG. 11B has a housing 1021a provided with a panel 1022a, a housing 1021b provided with a panel 1022b, a hinge 1023, a button 1024, a connection terminal 1025, a recording media inserting portion 1026, and a speaker 1027.

The housing 1021a and the housing 1021b are connected by the hinge 1023.

Since the electronic device in FIG. 11B includes the hinge 1023, it can be folded so that the panels 1022a and 1022b face each other.

The button 1024 is provided on the housing 1021b. Note that the button 1024 may be provided on the housing 1021a. For example, when the button 1024 having a function as a power button is provided, supply of power supply voltage to the electronic device can be controlled by pressing the button 1024.

The connection terminal 1025 is provided on the housing 1021a. Note that the connection terminal 1025 may be provided on the housing 1021b. Alternatively, a plurality of connection terminals 1025 may be provided on one or both of the housings 1021a and 1021b. The connection terminal 1025 is a terminal for connecting the electronic device illustrated in FIG. 11B to another device.

The recording media inserting portion 1026 is provided on the housing 1021a. The recording media inserting portion 1026 may be provided on the housing 1021b. Alternatively, a plurality of recording media inserting portions 1026 may be provided on one or both of the housings 1021a and 1021b. For example, a card-type recording medium is inserted into the recording media inserting portion so that data can be read to the electronic device from the card-type recording medium or data stored in the electronic device can be written to the card-type recording medium.

The speaker 1027 is provided on the housing 1021b. The speaker 1027 outputs sound. Note that the speaker 1027 may be provided on the housing 1021a.

Note that the housing 1021a or the housing 1021b may be provided with a microphone, in which case the electronic device in FIG. 11B can function as a telephone, for example.

The electronic device illustrated in FIG. 11B functions as at least one of a telephone, an e-book reader, a personal computer, and a game machine, for example.

In the panels 1022a and the panel 1022b, the display device with a touch sensor in one embodiment of the present invention can be used.

Figure 11C:
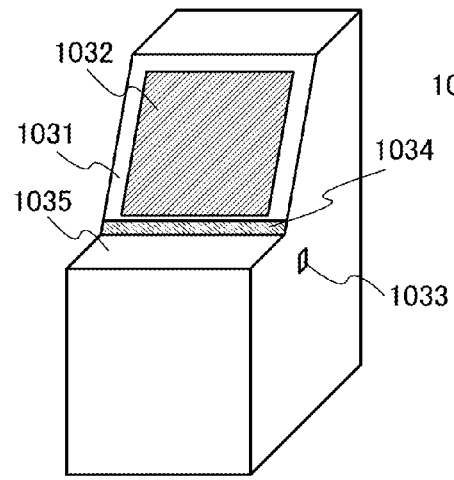

An electronic device illustrated in FIG. 11C is an example of a stationary information terminal. The electronic device illustrated in FIG. 11C has a housing 1031 which is provided with a panel 1032, a button 1033, and a speaker 1034.

Note that a panel similar to the panel 1032 may be provided on a top board 1035 of the housing 1031.

Further, the housing 1031 may be provided with a ticket slot for issuing a ticket or the like, a coin slot, a bill slot, and/or the like.

The button 1033 is provided on the housing 1031. For example, when the button 1033 is a power button, supply of a power voltage to the electronic device can be controlled by pressing the button 1033.

The speaker 1034 is provided on the housing 1031. The speaker 1034 outputs sound.

The electronic device in FIG. 11C functions as an automated teller machine, an information communication terminal (also referred to as multimedia station) for ordering a ticket or the like, or a game machine, for example.

In the panel 1032, the display device with a touch sensor in one embodiment of the present invention can be used.

Figure 11D:
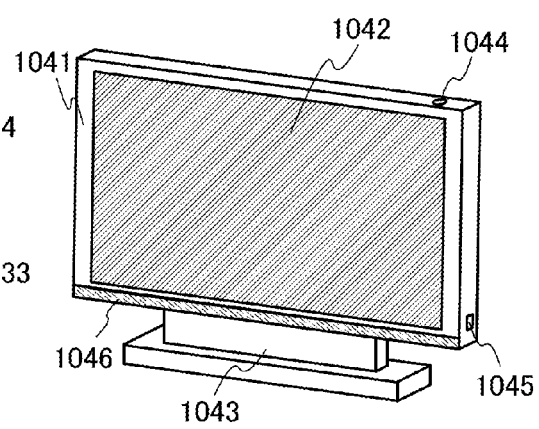

FIG. 11D illustrates an example of a stationary information terminal. The electronic device in FIG. 11D has a housing 1041 provided with a panel 1042, a support 1043 for supporting the housing 1041, a button 1044, a connection terminal 1045, and a speaker 1046.

Note that a connection terminal for connecting the housing 1041 to an external device may be provided.

The button 1044 is provided on the housing 1041. For example, when the button 1044 is a power button, supply of a power voltage to the electronic device can be controlled by pressing the button 1044.

The connection terminal 1045 is provided on the housing 1041. The connection terminal 1045 is a terminal for connecting the electronic device in FIG. 11D to another device. For example, when the electronic device in FIG. 11D and a personal computer are connected with the connection terminal 1045, the panel 1042 can display an image corresponding to a data signal input from the personal computer. For example, when the panel 1042 of the electronic device in FIG. 11D is larger than a panel of another electronic device connected thereto, a displayed image of the other electronic device can be enlarged, so that a plurality of viewers can easily see the image at the same time.

The speaker 1046 is provided on the housing 1041. The speaker 1046 outputs sound.

The electronic device in FIG. 11D functions as at least one of an output monitor, a personal computer, and a television set, for example.

In the panel 1042, the display device with a touch sensor in one embodiment of the present invention can be used.

The above is the description of the electronic devices illustrated in FIGS. 11A to 11D.

As described with reference to FIGS. 11A to 11D, the display device with a touch sensor in one embodiment of the present invention is used in the panel of each electronic device in this embodiment. Thus, the weight, size, and thickness of the electronic device can be decreased.

The display device in one embodiment of the present invention can also have flexibility because of its very small total thickness. Accordingly, the electronic device can also include a panel having a curved surface or a panel which can be curved.

This embodiment can be implemented in an appropriate combination with any of the other embodiments described in this specification.

This application is based on Japanese Patent Application serial no. 2012-177915 filed with Japan Patent Office on Aug. 10, 2012, the entire contents of which are hereby incorporated by reference.

What is claimed is:

1. A display device comprising:
   a first substrate;
   a display element over the first substrate;
   a color filter layer over the display element;
   a planarization layer over the color filter layer;
   a stress relief layer over the planarization layer;
   a sensor layer over the stress relief layer, the sensor layer including a first electrode, a second electrode, a third electrode, an insulating layer, and a wiring; and
   a second substrate over the sensor layer,
   wherein the planarization layer comprises a same material of the insulating layer, and
   wherein a product of a specific gravity and a dielectric constant of the stress relief layer is smaller than that of the second substrate.

2. The display device according to claim 1, wherein the first electrode, the second electrode, and the third electrode are in contact with a same surface.

3. The display device according to claim 1, wherein each of the first electrode, the second electrode, and the third electrode has a light-transmitting property.

4. The display device according to claim 1, wherein the wiring is electrically connected to the first electrode and the third electrode through an opening in the insulating layer.

5. The display device according to claim 1, wherein the wiring overlaps with the second electrode with the insulating layer interposed therebetween.

6. The display device according to claim 1, wherein a product of a specific gravity and a dielectric constant of the insulating layer is smaller than that of the second substrate.

7. The display device according to claim 1, further comprising:
   a bonding layer between the stress relief layer and the sensor layer,
   wherein a thickness of the bonding layer is thinner than that of the stress relief layer.

8. The display device according to claim 1, wherein the stress relief layer includes a polarizer.

9. The display device according to claim 1, wherein the display element includes a liquid crystal or a light-emitting organic compound.

10. A display device comprising:
    a first substrate;
    a display element over the first substrate;
    a color filter layer over the display element;
    a first insulating layer over the color filter layer;
    a stress relief layer over the first insulating layer;
    a sensor layer over the stress relief layer, the sensor layer including a first electrode, a second electrode, a third electrode, a second insulating layer, and a wiring; and
    a second substrate over the sensor layer,
    wherein the first insulating layer comprises a same material of the second insulating layer, and
    wherein a product of a specific gravity and a dielectric constant of the stress relief layer is smaller than that of the second substrate.

11. The display device according to claim 10, wherein the first electrode, the second electrode, and the third electrode are in contact with a same surface.

12. The display device according to claim 10, wherein each of the first electrode, the second electrode, and the third electrode has a light-transmitting property.

13. The display device according to claim 10, wherein the wiring is electrically connected to the first electrode and the third electrode through an opening in the second insulating layer.

14. The display device according to claim 10, wherein the wiring overlaps with the second electrode with the second insulating layer interposed therebetween.

15. The display device according to claim 10, wherein a product of a specific gravity and a dielectric constant of the second insulating layer is smaller than that of the second substrate.

16. The display device according to claim 10, further comprising:
    a bonding layer between the stress relief layer and the sensor layer,
    wherein a thickness of the bonding layer is thinner than that of the stress relief layer.

17. The display device according to claim 10, wherein the stress relief layer includes a polarizer.

18. The display device according to claim 10, wherein the display element includes a liquid crystal or a light-emitting organic compound.

19. The display device according to claim 1, wherein the insulating layer comprises an acrylic resin, an epoxy resin, or a resin having a siloxane bond.

20. The display device according to claim 10, wherein the second insulating layer comprises an acrylic resin, an epoxy resin, or a resin having a siloxane bond.

* * * * *